(12) United States Patent
Lee et al.

(10) Patent No.: US 12,389,287 B2
(45) Date of Patent: Aug. 12, 2025

(54) ELECTRONIC DEVICE PERFORMING MEASUREMENT REPORT AND METHOD FOR OPERATING THEREOF

(71) Applicant: SAMSUNG ELECTRONICS CO., LTD., Suwon-si (KR)

(72) Inventors: Kyoungho Lee, Suwon-si (KR); Janggun Bae, Suwon-si (KR); Sungsick Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 540 days.

(21) Appl. No.: 17/678,963

(22) Filed: Feb. 23, 2022

(65) Prior Publication Data
US 2022/0330104 A1    Oct. 13, 2022

Related U.S. Application Data

(63) Continuation of application No. PCT/KR2022/002454, filed on Feb. 18, 2022.

(30) Foreign Application Priority Data

Feb. 25, 2021  (KR) .................. 10-2021-0025426
Jan. 11, 2022  (WO) ................ PCT/KR2022/000474
Feb. 14, 2022  (KR) .................. 10-2022-0018789

(51) Int. Cl.
*H04W 36/00*    (2009.01)

(52) U.S. Cl.
CPC ... *H04W 36/0066* (2013.01); *H04W 36/0016* (2013.01); *H04W 36/0058* (2018.08)

(58) Field of Classification Search
CPC ......... H04W 36/0066; H04W 36/0058; H04W 36/0016
See application file for complete search history.

(56) References Cited

U.S. PATENT DOCUMENTS

2013/0155881 A1    6/2013 Amerga et al.
2014/0064253 A1    3/2014 Deivasigamani et al.
(Continued)

FOREIGN PATENT DOCUMENTS

KR    10-2014-0082549    7/2014
KR    10-2014-0113972    9/2014
(Continued)

OTHER PUBLICATIONS

Nokia, "HO during emergency services fallback," S2-2100652, SA WB2 Meeting, #143e, Feb. 18, 2021, 4.13.6.1-4.13.6.2.
(Continued)

*Primary Examiner* — Sujoy K Kundu
*Assistant Examiner* — Weibin Huang
(74) *Attorney, Agent, or Firm* — NIXON & VANDERHYE P.C.

(57) ABSTRACT

According to various embodiments, an electronic device may include: at least one processor, and the at least one processor may be configured to identify occurrence of an event associated with an internet protocol multimedia subsystem (IMS) voice service, in a state of being registered in a first core network based on a first radio access technology (RAT), identify at least one measurement report event corresponding to the occurred event among at least one first measurement report event associated with the first RAT and at least one second measurement report event associated with a second RAT different from the first RAT in the state of being registered in the first core network based on the first RAT, the first RAT and the second RAT being configured in the electronic device, and refrain from a measurement report corresponding to the identified measurement report event.

14 Claims, 30 Drawing Sheets

(56) References Cited

U.S. PATENT DOCUMENTS

| | | | |
|---|---|---|---|
| 2014/0179319 | A1 | 6/2014 | Kim et al. |
| 2015/0296401 | A1 | 10/2015 | Hamilton et al. |
| 2015/0296423 | A1 | 10/2015 | Zhang |
| 2015/0304937 | A1 | 10/2015 | Kim et al. |
| 2016/0035334 | A1 | 2/2016 | McNutt |
| 2016/0337928 | A1 | 11/2016 | Yang et al. |
| 2016/0353340 | A1* | 12/2016 | Yang ............... H04W 36/0058 |
| 2017/0055197 | A1 | 2/2017 | Shukair et al. |
| 2017/0237783 | A1 | 8/2017 | Yang et al. |
| 2018/0054767 | A1* | 2/2018 | Gholmieh ....... H04W 36/00226 |
| 2020/0314704 | A1 | 10/2020 | Abdel Shahid et al. |
| 2020/0383010 | A1 | 12/2020 | Zhu et al. |
| 2021/0136645 | A1* | 5/2021 | Zhao .................... H04W 36/30 |
| 2021/0211972 | A1* | 7/2021 | Zhang .................. H04W 24/10 |
| 2021/0227437 | A1* | 7/2021 | Venkataraman ...... H04W 60/04 |
| 2022/0248256 | A1* | 8/2022 | Lee .................. H04W 28/0268 |
| 2023/0388886 | A1* | 11/2023 | Huang ............. H04W 36/0088 |

FOREIGN PATENT DOCUMENTS

| | | |
|---|---|---|
| KR | 10-2015-0093823 | 8/2015 |
| KR | 10-1698285 | 1/2017 |
| WO | WO 2017-177452 A1 | 10/2017 |
| WO | 2019/183879 | 10/2019 |

OTHER PUBLICATIONS

Extended European Search Report dated May 17, 2024 for EP Application No. 22759989.1.

3GPP TS 23.502 V16.7.1 (Jan. 2021); 3rd Generation Partnership Project; Technical Specification Group Services and System Aspects; Procedures for the 5G Sxstem (SGS); vol. SA WGZ, No. V16.7; pp. 1-603.

* cited by examiner

ELECTRONIC DEVICE PERFORMING MEASUREMENT REPORT AND METHOD FOR OPERATING THEREOF

CROSS-REFERENCE TO RELATED APPLICATIONS

This application is a continuation of International Application No. PCT/KR2022/002454 designating the United States, filed on Feb. 18, 2022, in the Korean Intellectual Property Receiving Office and claiming priority to Korean Patent Application No. 10-2021-0025426, filed on Feb. 25, 2021, in the Korean Intellectual Property Office, International Application No. PCT/KR2022/000474, filed on Jan. 11, 2022 in the Korean Intellectual Property Receiving Office, and Korean Patent Application No. 10-2022-0018789, filed on Feb. 14, 2022, in the Korean Intellectual Property Office, the disclosures of which are incorporated by reference herein in their entireties.

BACKGROUND

Field

The disclosure relates to an electronic device for performing a measurement report and an operating method thereof.

Description of Related Art

To support various application scenarios based on an Internet protocol (IP) multimedia subsystem (IMS) voice service, a new radio (NR) connected to a user equipment (UE) and a 5th generation core (5GC) may support a radio access technology (RAT) fallback or a system (system) fallback. For example, the UE connected to the NR connected to the 5GC may be handed over (or directed or redirected) to an evolved universal mobile telecommunications system (UMTS) terrestrial radio access (E-UTRA) connected to the 5GC, which may be referred to as an RAT fallback. The UE connected to the NR connected to the 5GC may be handed over or redirected to an EPS (e.g., an E-UTRA connected to an evolved packet core (EPC)), which may be referred to as a system fallback.

A serving access and mobility function (AMF) for the UE may notify the UE that an IMS voice service through a PS session is supported during a registration procedure of the UE. When a request for establishment of a QoS flow for an IMS voice reaches a next-generation radio access network (NG-RAN), the NG-RAN responds to report the rejection of the request for the establishment and may trigger one of the following procedures, based on UE capability, N26 possibility, a network configuration, and a radio condition.

Redirection to evolved packet system (EPS)
Handover to EPS
Redirection to E-UTRA connected to 5GC
Handover to E-UTRA connected to 5GC Based on the above description, the UE may access the EPS and/or E-UTRA to perform the IMS voice service. The UE may perform a fallback in order to perform an emergency service in addition to the IMS voice service. After the fallback, the UE may return to the NR connected to the 5GC.

As described above, to perform a rapid IMS voice service, an electronic device needs to quickly perform a fallback procedure. In addition, after performing the IMS voice service, the electronic device needs to quickly return to a previously connected 5GC. However, the fallback procedure and a procedure of returning to the 5GC may be delayed due to a measurement report event configured in the electronic device. For example, even though a change of RAT is required for the fallback procedure, the electronic device performs an inter-frequency measurement report or an intra-frequency measurement report and may thus be handed over (or redirected) to a different cell of a currently connected RAT (e.g., E-UTRA), and accordingly the fallback procedure may be delayed. Alternatively, since a measurement report causing an RAT change is performed before an EPS bearer for the IMS voice service is established after the fallback, the electronic device may return to the 5GC. In addition, there may be various examples in which the IMS voice service is delayed or interrupted by a configured measurement report event.

When an event associated with an IMS voice service is identified, an electronic device and an operating method thereof according to various embodiments may deactivate at least some identified events of measurement report events configured in the electronic device.

SUMMARY

According to various example embodiments, there may be provided an electronic device and an operating method thereof that are capable of deactivating at least some identified events of measurement report events configured in the electronic device when events associated with an IMS voice service are identified. Accordingly, a measurement report according to the deactivated measurement report events may not be performed, thereby reducing a delay or interruption of the IMS voice service.

According to various example embodiments, an electronic device may include: at least one processor, and the at least one processor may be configured to: identify occurrence of an event associated with an internet protocol multimedia subsystem (IMS) voice service in a state of being registered in a first core network based on a first radio access technology (RAT), identify at least one measurement report event corresponding to the occurred event among at least one first measurement report event associated with the first RAT and at least one second measurement report event associated with a second RAT different from the first RAT in the state of being registered in the first core network based on the first RAT, the first RAT and the second RAT being configured in the electronic device, and refrain from a measurement report corresponding to the identified measurement report event.

According to various example embodiments, a method of operating an electronic device may include: identifying occurrence of an event associated with an internet protocol multimedia subsystem (IMS) voice service in a state of being registered in a first core network based on a first radio access technology (RAT), identifying at least one measurement report event corresponding to the occurred event among at least one first measurement report event associated with the first RAT and at least one second measurement report event associated with a second RAT different from the first RAT in the state of being registered in the first core network based on the first RAT, the first RAT and the second RAT being configured in the electronic device, and refraining from a measurement report corresponding to the identified measurement report event.

According to various example embodiments, there may be provided an electronic device and an operating method thereof that are capable of deactivating at least some identified events of measurement report events configured in the electronic device when events associated with an IMS voice service are identified. Accordingly, a measurement report according to the deactivated measurement report events may not be performed, thereby preventing and/or reducing the IMS voice service from being delayed or interrupted.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
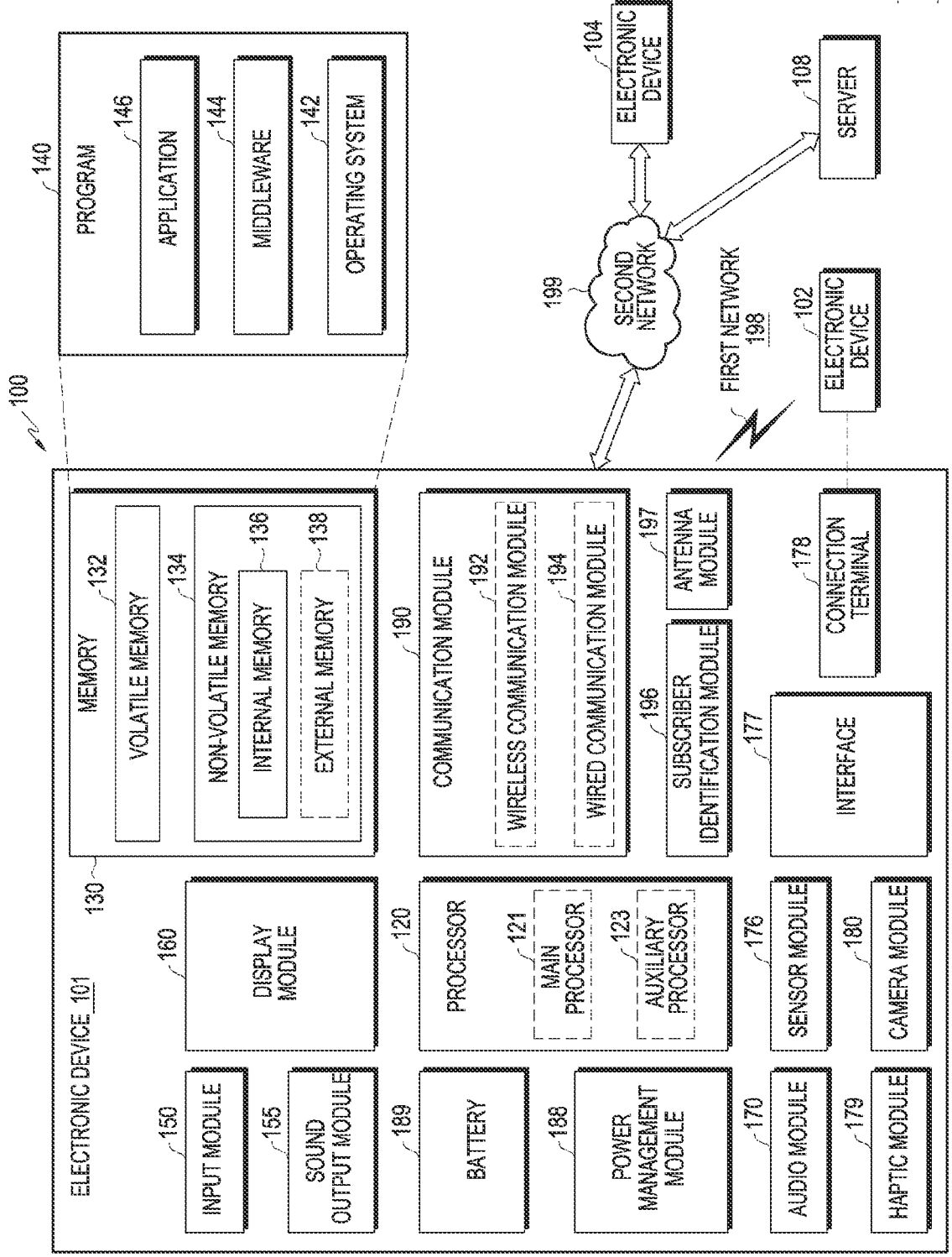
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
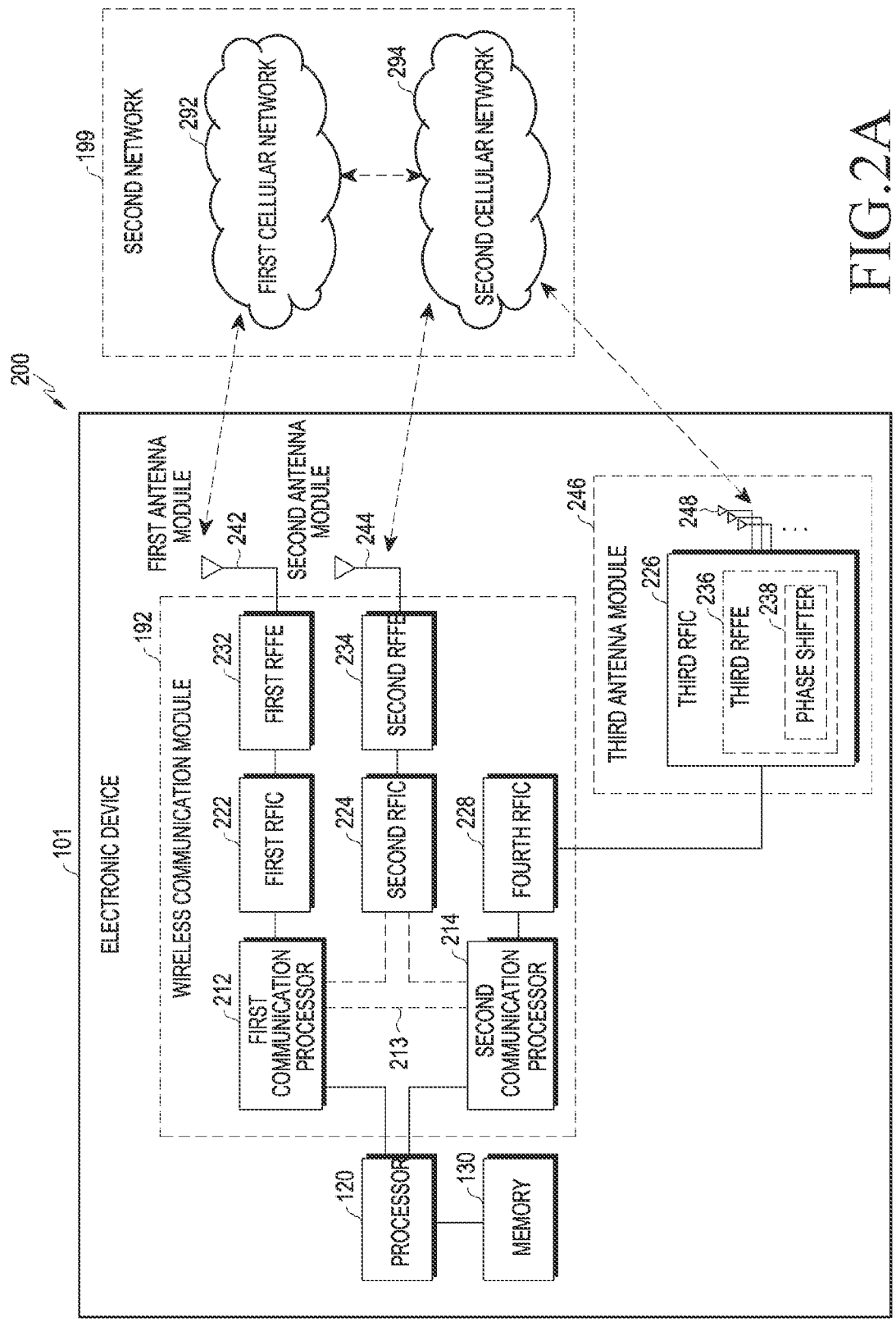
FIGS. 2A and 2B are block diagrams illustrating example configurations of an electronic device for supporting communication via a legacy network and communication via a 5G network according to various embodiments.

FIG. 2A is a block diagram 200 illustrating an example configuration of an electronic device 101 for supporting communication via a legacy network and communication via a 5G network according to various embodiments. Referring to FIG. 2A, the electronic device 101 may include a first communication processor (e.g., including processing circuitry) 212, a second communication processor (e.g., including processing circuitry) 214, a first radio-frequency integrated circuit (RFIC) 222, a second RFIC 224, a third RFIC 226, a fourth RFIC 228, a first radio-frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to an embodiment, the electronic device 101 may further include at least one of the components illustrated in FIG. 1, and the second network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least part of a communication module 192. According to an embodiment, the fourth RFIC 228 may be omitted or may be included as part of the third RFIC 226.

The first communication processor 212 may include various processing circuitry and establish a communication channel in a band to be used for wireless communication with the first cellular network 292 and may support communication via a legacy network through the established communication channel. According to various embodiments, the first cellular network may be a legacy network including a second-generation (2G), 3G, 4G, or long-term evolution (LTE) network. The second communication processor 214 may include various processing circuitry and establish a communication channel corresponding to a specified band (e.g., about 6 GHz to about 60 GHz) in a band to be used for wireless communication with the second cellular network 294 and may support communication via a 5G network through the established communication channel. According to various embodiments, the second cellular network 294 may be a 5G network defined by the 3GPP. In addition, according to an embodiment, the first communication processor 212 or the second communication processor 214 may establish a communication channel corresponding to a different specified band (e.g., about 6 GHz or lower) in the band to be used for wireless communication with the second cellular network 294 and may support communication via a 5G network through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive the data to be transmitted from the second communication processor 214. For example, the first communication processor 212 may transmit and receive data to and from the second communication processor 214 through an inter-processor interface 213. The inter-processor interface 213 may be configured, for example, as a universal asynchronous receiver/transmitter (UART, e.g., high-speed UART (HS-UART)) or peripheral component interconnect express (PCIe) bus interface but is not limited in type. Alternatively, the first communication processor 212 and the second communication processor 214 may exchange control information and packet data information, for example, using a shared memory. The first communication processor 212 may transmit and receive various types of information, such as sensing information, output strength information, and resource block (RB) allocation information, to and from the second communication processor 214.

The first communication processor 212 may not be directly connected to the second communication processor 214 depending on a configuration. In this case, the first communication processor 212 may transmit and receive data to and from the second communication processor 214 via a processor 120 (e.g., an application processor). For example, the first communication processor 212 and the second communication processor 214 may transmit and receive data to and from each other through the processor 120 (e.g., the application processor) and an HS-UART interface or a PCIe interface, but the type of an interface is not limited. Alternatively, the first communication processor 212 and the second communication processor 214 may exchange control information and packet data information using the processor 120 (e.g., the application processor) and a shared memory.

Figure 2B:
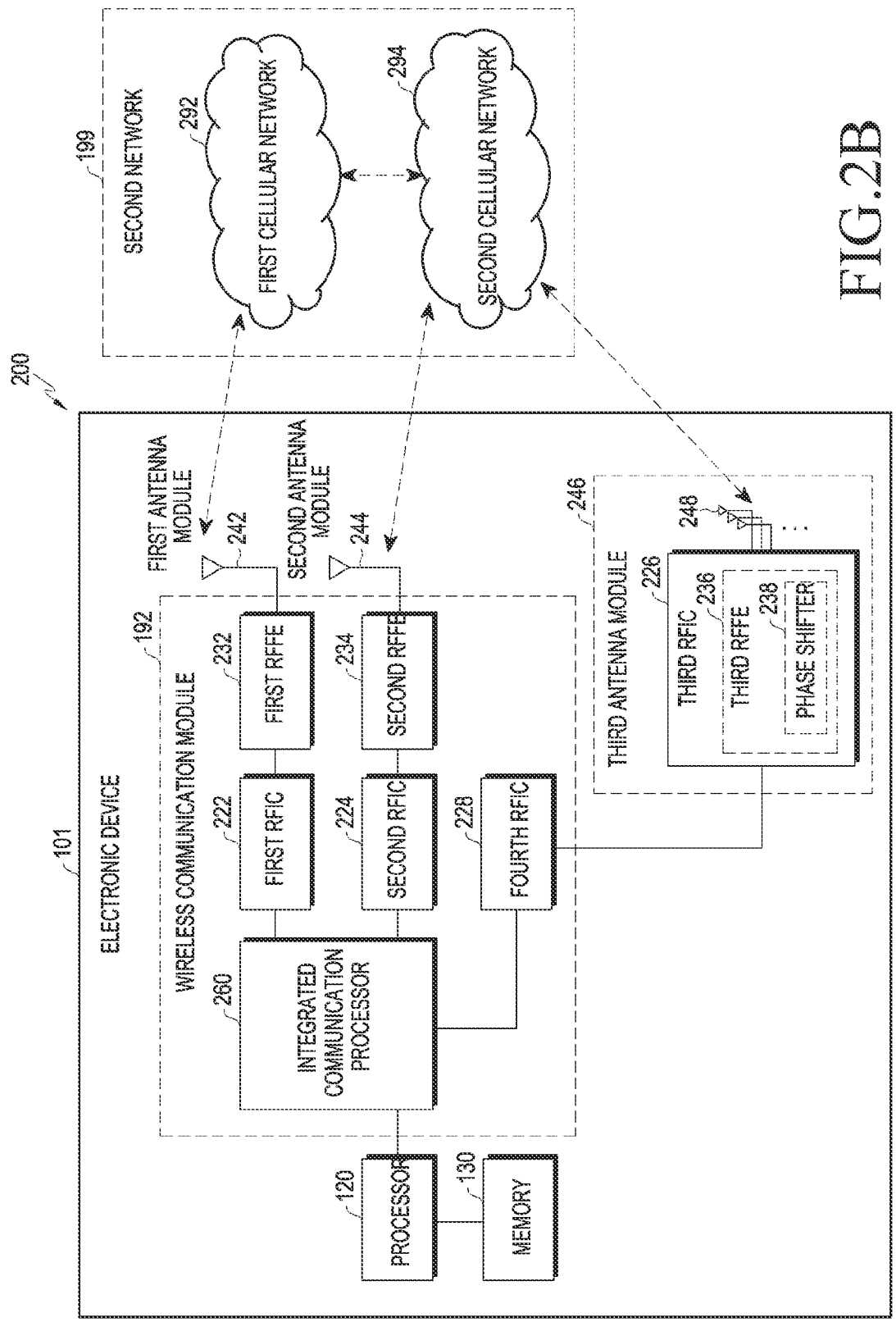

According to an embodiment, the first communication processor 212 and the second communication processor 214 may be configured in a single chip or a single package. According to various embodiments, the first communication processor 212 or the second communication processor 214 may be configured along with the processor 120, a coprocessor 123, or a communication module 190 in a single chip or a single package. For example, as illustrated in FIG. 2B, an integrated communication processor (e.g., including processing circuitry) 260 may support functions for communication with both the first cellular network 292 and the second cellular network 294.

In transmission, the first RFIC 222 may convert a baseband signal generated by the first communication processor 212 into a radio-frequency (RF) signal of about 700 MHz to about 3 GHz used for the first cellular network 292 (e.g., a legacy network). In reception, an RF signal may be obtained from the first network 292 (e.g., the legacy network) through an antenna (e.g., the first antenna module 242) and may be preprocessed by an RFFE (e.g., the first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, "5G sub-6 RF signal") in a sub-6 band (e.g., about 6 GHz or lower) used for the second cellular network 294 (e.g., a 5G network). In reception, a 5G sub-6 RF signal may be obtained from the second cellular network 294 (e.g., the 5G network) through an antenna (e.g., the second antenna module 244) and may be preprocessed by an RFFE (e.g., the second RFFE 234). The second RFIC 224 may convert the preprocessed 5G sub-6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter, "5G above-6 RF signal") in a 5G above-6 band (e.g., about 6 GHz to about 60 GHz) used for the second cellular network 294 (e.g., the 5G network). In reception, a 5G above-6 RF signal may be obtained from the second cellular network 294 (e.g., the 5G network) through an antenna (e.g., an antenna 248) and may be preprocessed by the third RFFE 236. The third RFIC 226 may convert the preprocessed 5G above-6 RF signal into a baseband signal to be processed by the second communication processor 214. According to an embodiment, the third RFFE 236 may be configured as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 into an RF signal (hereinafter, "IF signal") in an intermediate frequency band (e.g., about 9 GHz to about 11 GHz) and may transmit the IF signal to the third RFIC 226. The third RFIC 226 may convert the IF signal into a 5G above-6 RF signal. In reception, a 5G above-6 RF signal may be received from the second cellular network 294 (e.g., the 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least part of a single chip or a single package. According to various embodiments, in FIG. 2A or FIG. 2B, when the first RFIC 222 and the second RFIC 224 are configured as a single chip or a single package, the first RFIC 222 and the second RFIC 224 may be configured as an integrated RFIC. In this case, the integrated RFIC may be connected to the first RFFE 232 and the second RFFE 234, thus converting a baseband signal into a signal in a band supported by the first RFFE 232 and/or the second RFFE 234, and transmitting the converted signal to one of the first RFFE 232 and the second RFFE 234. According to an embodiment, the first RFFE 232 and the second RFFE 234 may be configured as at least part of a single chip or a single package. According to an embodiment, at least one of the first antenna module 242 or the second antenna module 244 may be omitted or may be combined with a different antenna module to process corresponding RF signals in a plurality of bands.

According to an embodiment, the third RFIC 226 and the antenna 248 may be disposed on the same substrate to form a third antenna module 246. For example, the communication module 192 or the processor 120 may be disposed on a first substrate (e.g., a main PCB). In this case, the third RFIC 226 may be disposed in a portion (e.g., a lower surface) of a second substrate (e.g., a sub-PCB) separate from the first substrate, and the antenna 248 may be disposed in another portion (e.g., an upper surface), thereby forming the third antenna module 246. The third RFIC 226 and the antenna 248 may be disposed on the same substrate, thereby reducing the length of a transmission line therebetween, which may reduce loss (e.g., attenuation) of, for example, a signal in a high-frequency band (e.g., about 6 GHz to about 60 GHz) used for communication via a 5G network due to the transmission line. Accordingly, the electronic device 101 may improve the quality or speed of communication with the second network 294 (e.g., the 5G network).

According to an embodiment, the antenna 248 may be configured as an antenna array including a plurality of antenna elements which can be used for beamforming. In this case, the third RFIC 226 may include, for example, a plurality of phase shifters 238 corresponding to the plurality of antenna elements as part of the third RFFE 236. In transmission, each of the plurality of phase shifters 238 may convert the phase of a 5G above-6 RF signal to be transmitted to an external device (e.g., a base station of the 5G network) of the electronic device 101 through a corresponding antenna element. In reception, each of the plurality of phase shifters 238 may convert the phase of a 5G above-6 RF signal received from the outside through a corresponding antenna element into the same phase or substantially the same phase. This enables transmission or reception through beamforming between the electronic device 101 and the outside.

The second cellular network 294 (e.g., the 5G network) may operate independently of the first cellular network 292 (e.g., the legacy network) (e.g., stand-alone (SA) mode) or may be connected to operate (e.g., non-stand-alone (NSA) mode). For example, the 5G network may have only an access network (e.g., a 5G radio access network (RAN) or a next-generation RAN (NG RAN)) and may not have a core network (e.g., a next-generation core (NGC)). In this case, after accessing the access network of the 5G network, the electronic device 101 may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in a memory 230 and may be accessed by a different component (e.g., the processor 120, the first communication processor 212, or the second communication processor 214).

Figure 3:
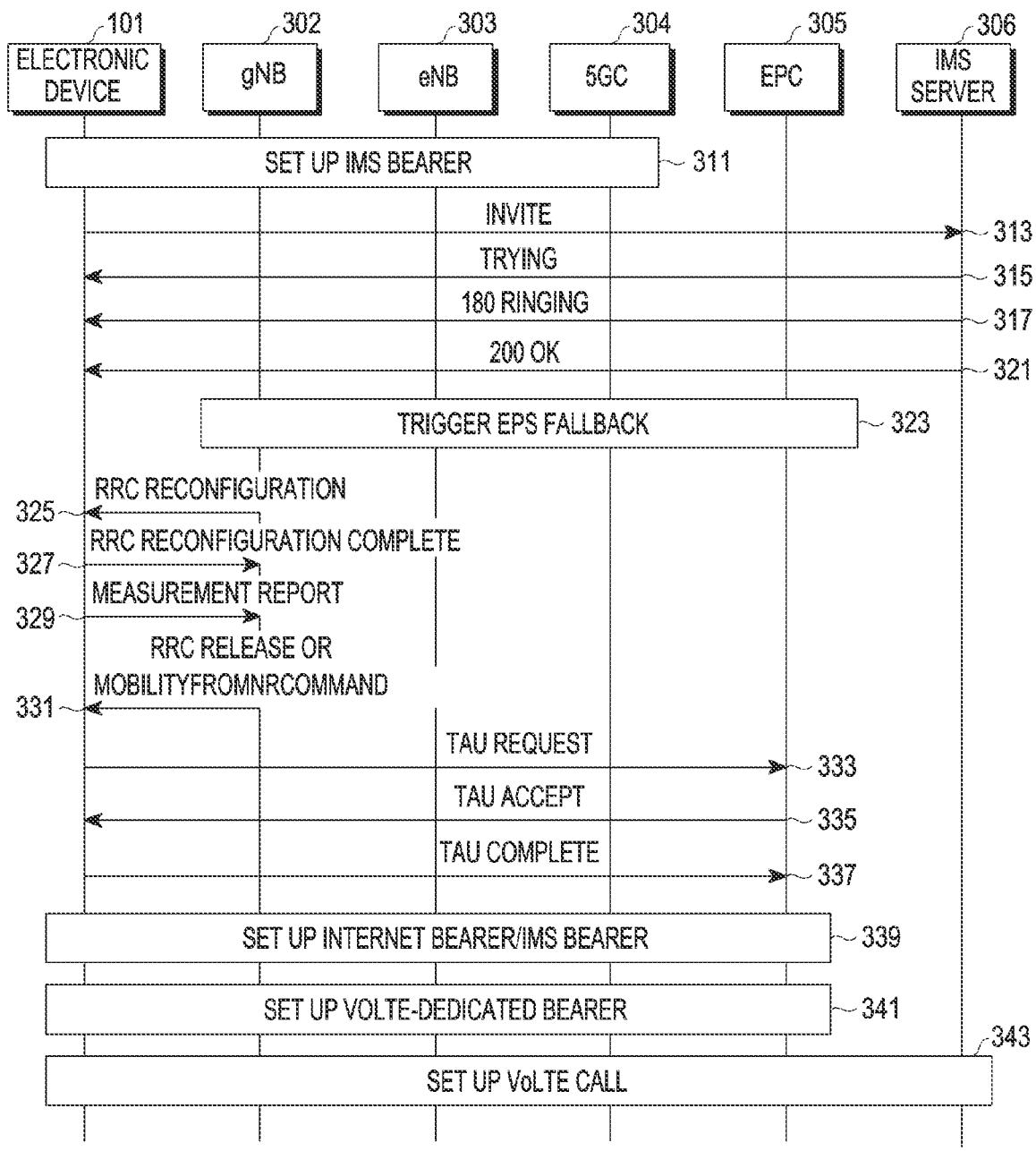
FIG. 3 is a signal flow diagram illustrating an example evolved packet system (EPS) fallback according to various embodiments.

FIG. 3 is a signal flow diagram illustrating an example evolved packet system (EPS) fallback according to various embodiments.

According to various embodiments, in operation 311, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may set up an IMS bearer with a 5GC 304. In some cases, it will be understood by those skilled in the art that the IMS bearer may be referred to as a PDU session (or QoS flow within a PDU session) of an IMS DNN. For example, setting up the IMS bearer may refer, for example, to the electronic device 101 setting up a QoS flow (or bearer) for transmitting and receiving a packet for an IMS service through a process of establishing a PDU session (or PDN connection) of the IMS DNN (or APN). Although not shown, the electronic device 101 may perform a process of registering with an IP multimedia subsystem (IMS) server 306, based on the IMS bearer. For example, the electronic device 101 may transmit a registration request (e.g., SIP register) based on a public user identity (PUI), which is identification information corresponding to the IMS server 306 (or IMS network) of a specific communication service provider, to the IMS server 306 (e.g., a proxy call state control function (PCSCF)). The electronic device 101 may receive protocol configuration options (PCO) from the 5GC 304. The electronic device 101 may obtain address information (e.g., an IP address) corresponding to the IMS server 306, based on the protocol configuration options. The electronic device 101 may transmit the registration request to the IMS server 306 through at least some of a gNB 302 and the 5GC 304, based on the address information. The IMS server 306 may register the electronic device 101 in the IMS server 306, based on the registration request, and may transmit a response (e.g., OK) to the registration request to the electronic device 101. Accordingly, the electronic device 101 may be registered in the IMS server 306.

According to various embodiments, in operation 313, the electronic device 101 may transmit an INVITE message to the IMS server 306. For example, in an embodiment of FIG. 3, it is assumed that the electronic device 101 is a mobile originating (MO) terminal. In operation 315, the IMS server 306 may transmit a TRYING message to the electronic device 101 in response to the received INVITE message. The IMS server 306 may transmit a paging signal to a mobile terminating (MT) terminal through the 5GC 304, based on information about the MT terminal included in the INVITE message. The MT terminal may switch from an idle state to a connected state, for example, upon receiving the paging signal, and may receive the INVITE message from the IMS server 306. The MT terminal may transmit a 180 RING message to the IMS server 306, and the IMS server 306 may transmit the 180 RING message to the electronic device 101 in operation 317. When the MT terminal performs an answer, a 200 OK message may be transmitted from the MT terminal to the electronic device 101 through the IMS server 306 in operation 321. The messages transmitted to and received from the electronic device 101 through the IMS server 306 may be based on, for example, a session initiation protocol (SIP), but are not limited thereto. In addition, it will be understood by those skilled in the art that the messages transmitted and received between the IMS server 306 and the electronic device 101 are transmitted and received through, for example, a core network (CN) and/or a radio access network (RAN).

According to various embodiments, in operation 323, an EPS fallback may be triggered. For example, the 5GC 304 may perform PDU session modification to establish a QoS flow for an IMS voice. However, when the gNB 302 does not support the QoS flow, the gNB 302 may perform triggering for a fallback. A detailed operation for the fallback will be described in greater detail below with reference to FIG. 4. In operation 325, the gNB 302 may transmit a radio resource control (RRC) reconfiguration message including measConfig for band measurement of an E-UTRA to the electronic device 101. The electronic device 101 may identify at least one measurement object, based on the RRC reconfiguration message. In operation 327, the electronic device 101 may transmit an RRC reconfiguration complete message to the gNB 302. As a result of performing measurement according to a configured measurement object, when an event of a measurement report is satisfied, the electronic device 101 may transmit a measurement report (MR) message to the gNB 302 in operation 329. The gNB 302 and the 5GC 304 may determine frequency information and/or cell information or redirection information for a handover, based on the received MR message. In operation 331, the gNB 302 may transmit an RRC release message including the redirection information or a mobilityFromNR-Command (hereinafter, interchangeable with a handover command) including target cell information for a handover to the electronic device 101.

According to various embodiments, the electronic device 101 may perform a random access channel (RACH) procedure with an eNB 303, which is a cell discovered based on information included in the RRC release message or a handover message. The electronic device 101 may perform a tracking area update (TAU) procedure with an EPS 305 through the eNB 303. For example, in operation 333, the electronic device 101 may transmit a TAU Request message to the EPC 305 through the eNB 303. In operation 335, the electronic device 101 may receive a TAU Accept message from the EPC 305. In operation 337, the electronic device 101 may transmit a TAU Complete message to the EPC 305.

Accordingly, the EPS fallback of the electronic device 101 may be performed. There is a possibility that the electronic device 101 reports an MR message associated with NR before the EPS fallback is completed. When the electronic device 101 identifies that event Ax (e.g., event A1 to event A6) is satisfied and reports a corresponding MR message, the electronic device 101 may be handed over to a different gNB before the EPS fallback is completed. In this case, as a procedure for the EPS fallback needs to be performed again, the EPS fallback may be delayed. The electronic device 101 according to various embodiments may deactivate event Ax until the EPS fallback is completed, which will be described later.

According to various embodiments, in operation 339, the electronic device 101 may set up an Internet bearer (or PDN connection of an Internet APN) and/or an IMS bearer (or PDN connection of an IMS APN). In operation 341, the electronic device 101 may set up a dedicated bearer for VoLTE. In operation 343, the electronic device 101 may set up a VoLTE call and may transmit and receive a packet for a call through the dedicated bearer. There is a possibility that the electronic device 101 reports an MR message associated with NR before the dedicated bearer is set up. When the electronic device 101 identifies that event Bx (e.g., event B1 and event B2) is satisfied and reports a corresponding MR message, the electronic device 101 may be handed over back to an NR base station before the dedicated bearer is set up. In this case, as a procedure for the EPS fallback and a procedure for setting up the dedicated bearer need to be performed again, setup of the VoLTE call may be delayed. The electronic device 101 according to various embodiments may deactivate event Bx until the dedicated bearer is set up, which will be described later.

In an embodiment, the electronic device 101 may perform an EPS fallback without measurement and transmission of an MR message. For example, the gNB 302 may previously store and/or manage information related to the neighboring eNB 303. When an EPS fallback is triggered, the gNB 302 may transmit an RRC release message including redirection information or a handover command including information about a target cell to the electronic device 101, based on the previously stored and/or managed information without receiving an MR message from the electronic device 101. Even in this case, the electronic device 101 may deactivate at least some of the previously configured MR events.

Figure 4:
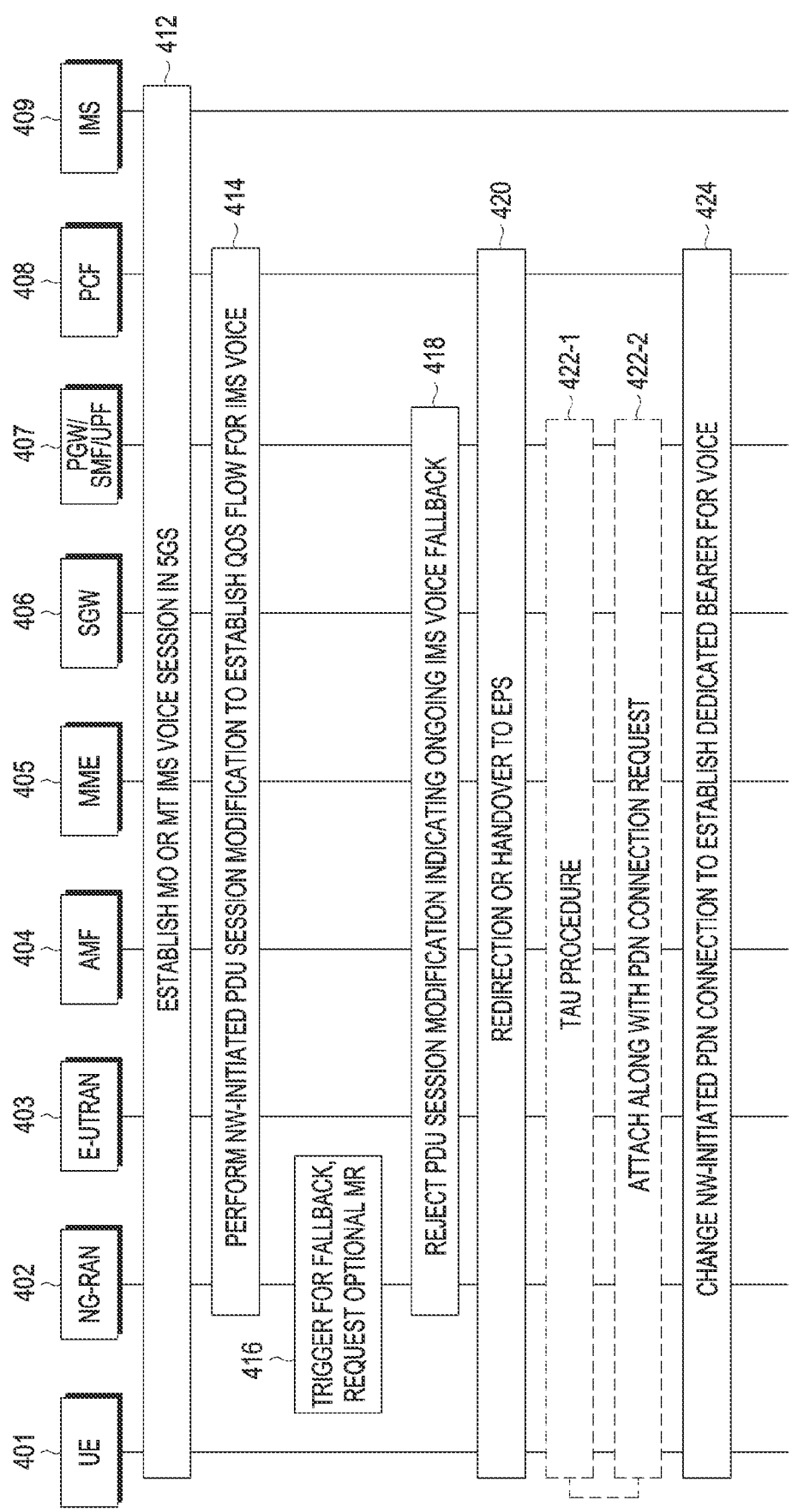
FIG. 4 is a signal flow diagram illustrating an example EPS fallback according to various embodiments.

FIG. 4 is a signal flow diagram illustrating an example EPS fallback according to various embodiments.

Referring to FIG. 4, a 5G communication network may include an NG-RAN 402, an access and mobility management function (AMF) 404, a session management function (SMF)/user plane function (UPF) 407, and a policy control function (PCF) 408. An LTE communication network may include an E-URTAN 403, a mobility management entity (MME) 405, a serving gateway (SGW) 406, and a PDN gateway (PGW) 407.

According to various embodiments, when a call is requested, a UE 401 (e.g., the electronic device 101) may establish a mobile originating (MO) or mobile terminating (MT) IMS voice session with an IMS network 409 in the 5G communication network in operation 412. In operation 414, the 5G communication network may perform protocol data unit (PDU) session modification initiated to establish a QoS flow for an IMS voice.

According to various embodiments, as described above, when the NG-RAN 402 of the 5G communication network does not support the QoS flow, the NG-RAN 402 may perform triggering for a fallback and may perform solicitation of an optional measurement report (MR) for the UE 401 in operation 416. In operation 418, the NG-RAN 402 may reject a PDU session modification indicating an ongoing IMS voice fallback. According to various embodiments, the UE 401 and the NG-RAN 402 may perform a redirection or handover to an EPS in operation 420. According to the redirection or handover to the EPS, the UE 401 may perform operation 422-1 or operation 422-2. For example, in operation 422-1, the UE 401 performs a tracking area update (TAU) procedure with the LTE communication network (e.g., the E-UTRAN 403, the MME 405, the SGW 406, and the PGW 407-1). In operation 422-2, the UE 401 may request a PDN connection to the LTE communication network and may be attached to the LTE communication network. In operation 424, the UE 401 and the LTE communication network may change the network-initiated PDN connection to establish a dedicated bearer for a voice. After completing the EPS fallback, the UE 401 may perform a call through the LTE communication network and the IMS network 409.

Figure 5:
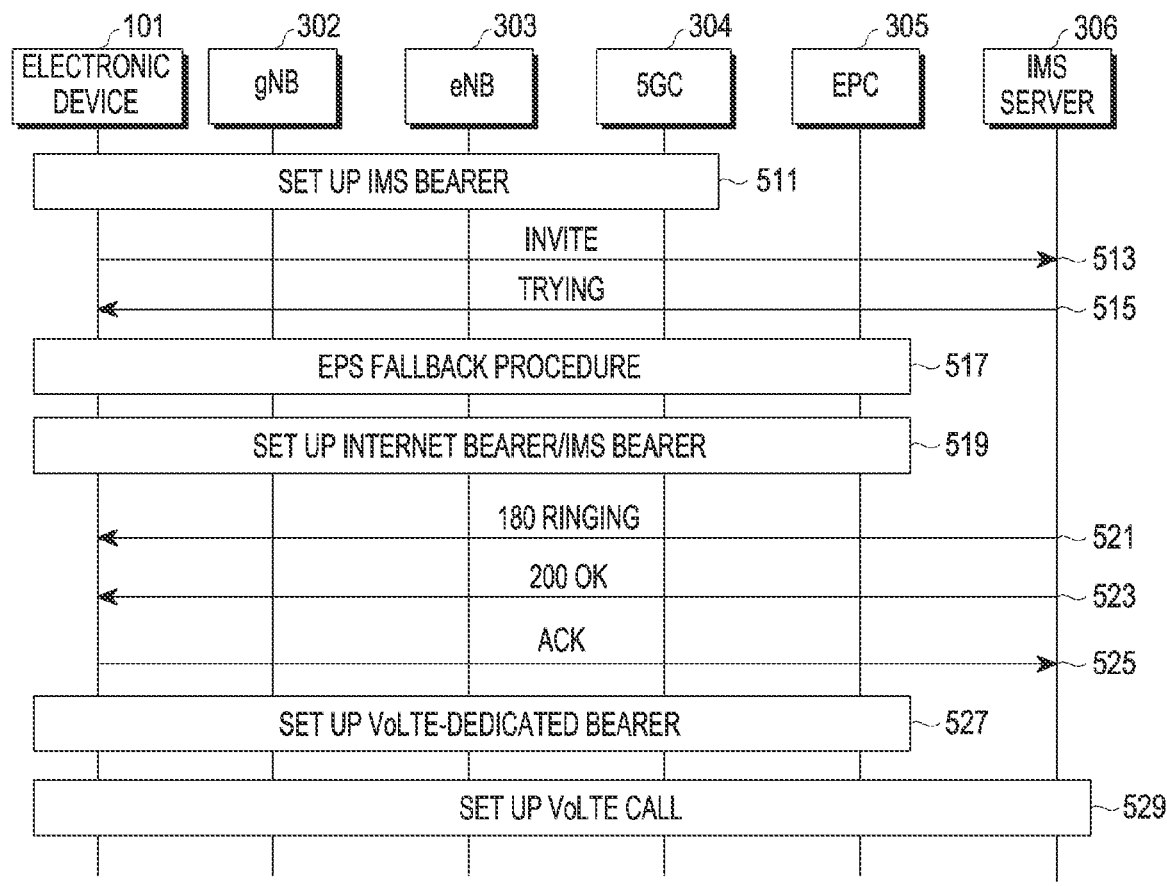
FIG. 5 is a signal flow diagram illustrating an example EPS fallback according to various embodiments.

FIG. 5 is a signal flow diagram illustrating an example EPS fallback according to various embodiments. Among operations illustrated in FIG. 5, operations described with reference to with FIG. 3 will be briefly described.

According to various embodiments, in operation 511, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may set up an IMS bearer (or a PDU session of an IMS DNN (or a QoS flow within the PDU session)). In operation 513, the electronic device 101 may transmit an INVITE message to an IMS server 306, based on the IMS bearer. In operation 515, the IMS server 306 may transmit a TRYING message to the electronic device 101. In operation 517, the electronic device 101 may perform an EPS fallback procedure. Compared to the embodiment of FIG. 3, in the embodiment of FIG. 5, the electronic device 101 may perform the EPS fallback procedure after transmitting the INVITE message and receiving the TRYING message and before receiving a 180 RINGING message. In an example, the electronic device 101 may perform measurement, based on a measurement object identified from an RRC reconfiguration message received from a gNB 302. As a measurement result satisfies a reporting condition, the electronic device 101 may transmit an MR message including a measurement event to the gNB 302. The gNB 302 may determine redirection information or handover target cell information, based on the received MR message. The electronic device 101 may receive an RRC release message including the redirection information or a handover command including the target cell information received from the gNB 302. The electronic device 101 may perform a redirection or handover and may then perform a TAU procedure (or Attach procedure) for an EPC 305. The electronic device 101 may receive an RRC release message including redirection information or a handover command including target cell information received from the gNB 302 without transmitting the MR message. The electronic device 101 may perform a redirection or handover and may then perform a TAU procedure (or an Attach procedure) for the EPC 305. In operation 519, the electronic device 101 may set up an Internet bearer (or a PDN connection of an Internet APN) and/or an IMS bearer (or a PDN connection of an IMS APN). In operation 521, the electronic device 101 may receive the 180 RINGING message, based on the Internet bearer (or the PDN connection of the Internet APN) and/or the IMS bearer (or the PDN connection of the IMS APN). In operation 523, the electronic device 101 may receive a 200 OK message generated by reception of an MT terminal. In operation 525, the electronic device 101 may transmit an ACK message. In operation 527, the electronic device 101 may set up a VoLTE dedicated bearer. In operation 529, the electronic device 101 may set up a VoLTE call, based on the set VoLTE dedicated bearer.

As described above, the electronic device 101 may perform the EPS fallback procedure, and a time to perform the EPS fallback procedure may be after the electronic device 101 receives the 200 OK message as described in FIG. 3, or may be after receiving the TRYING message and before receiving the 180 RINGING message as described in FIG. 5.

Figure 6:
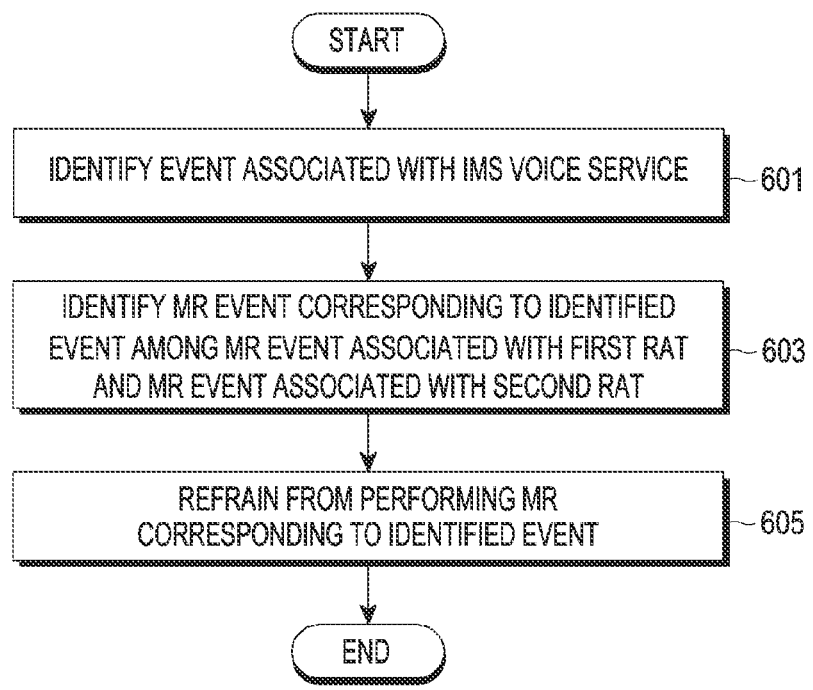
FIG. 6 is a flowchart illustrating an example method of operating an electronic device according to various embodiments.

FIG. 6 is a flowchart illustrating an example method of operating an electronic device according to various embodiments.

According to various embodiments, in operation 601, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may identify an event associated with an IMS voice service. For example, the electronic device 101 may identify the event associated with the IMS voice service in a state of being registered in a first core network based on a first RAT. At least one first measurement report event associated with the first RAT and at least one second measurement report event associated with a second RAT different from the first RAT may be configured in the electronic device 101. The at least one first measurement report event and the at least one second measurement report event may be identified from an RRC reconfiguration message. The configuration time of the at least one first measurement report event and the at least one second measurement report event may be before or after the event associated with the IMS voice service occurs, and various examples thereof will be described later.

When the electronic device 101 is, for example, in an RRC_CONNECTED state, the network may perform an RRC connection reconfiguration procedure. For example, when the RRC connection reconfiguration message includes a measurement configuration (e.g., measConfig of 3GPP TS 38.331 or 36.331), the electronic device 101 may perform a measurement configuration procedure (e.g., a measurement configuration procedure configured in 3GPP TS 38.331 or 36.331). For example, and without limitation, the electronic device 101 may be requested to perform the following types of measurements:

Intra-frequency measurement: Measurement at downlink carrier frequency(s) of serving cell(s)

Inter-frequency measurement: Measurement at frequencies different from any frequency among downlink carrier frequency(s) of serving cell(s)

Measurement at frequency of inter-RAT (e.g., NR, UTRA, GERAN, CDMA 2000 HRPD, or CDMA 2000 1×RTT)

In the above, the measurement at the frequency of the inter-RAT is reflected based on the E-UTRA. However, when an RAT to which the electronic device 101 connects is NR, the inter-RAT may be E-UTRA, UTRA, GERAN, CDMA 2000 HRPD, or CDMA 2000 1×RTT). The measurement configuration may include information about a measurement object. The measurement object may include, for example, subcarrier spacing and a frequency/time position of a reference signal to be measured. The electronic device 101 may identify a frequency for measurement, based on the measurement object in the measurement configuration. The measurement object may also include information indicating a frequency for measurement (e.g., ARFCN-ValueEUTRA and/or ARFCN-ValueNR), a measurement object identity, or a blacklist of a cell and/or a whitelist of a cell. The measurement configuration of the RRC reconfiguration message may include a reporting configuration. For example, the reporting configuration may include at least one of a reporting criterion, a reporting format, or an RS type but is not limited thereto. For convenience of description, the reporting condition may be referred to as a measurement reporting event. The electronic device 101 may measure at least one of a reference signal received power (RSRP), a reference signal received quality (RSRQ), a reference signal strength indicator (RSSI), or a signal-to-interference-plus-noise ratio (SINR) corresponding to at least one of an inter-frequency, an intra-frequency, or an inter-RAT according to the measurement configuration. The electronic device 101 may identify that a measurement result satisfies a measurement condition. The electronic device 101 may identify a measurement result, for example, from a physical layer, and may determine whether the reporting criterion is satisfied, based on the measurement result. The electronic device 101 may perform filtering (e.g., layer 3 filtering) on the execution result and may determine whether the reporting criterion is satisfied, based on a filtering result. In various embodiments of the disclosure, "measurement result" may refer to, for example, at least one of a value obtained from the physical layer or a value obtained by filtering the value obtained from the physical layer.

In various embodiments, the at least one first measurement report event associated with the first RAT is a measurement report event associated with an RAT the same as the RAT to which the electronic device 101 currently connects, and may be, for example, and without limitation, as follows:

Event A1: Serving becomes better than threshold
Event A2: Serving becomes worse than threshold
Event A3: Neighbor becomes offset better than PCell/PSCell (or NR SpCell)
Event A4: Neighbor becomes worse than threshold
Event A5: PCell/PSCell (or NR SpCell) becomes worse than threshold1 and neighbor (or NR neighbor/SCell) becomes better than threshold2
Event A6: Neighbor becomes offset better than SCell (or NR SCell)

In various embodiments, the at least one second measurement report event associated with the second RAT is a measurement report event associated with an RAT different from the RAT to which the electronic device 101 currently connects, and may be, for example, as follows.

Event B1: Inter RAT neighbor becomes better than threshold
Event B2: PCell becomes worse than threshold1 and inter RAT neighbor becomes better than threshold2

The foregoing measurement report events may follow, for example, 3GPP TS 36.331 or 3GPP TS 38.331 but are not limited to a specific type. For convenience of description, at least some of events A1 to A6 may be referred to as event Ax, and at least some of events B1 and B2 may be referred to as event Bx.

According to various embodiments, in operation 603, the electronic device 101 may identify a measurement report (MR) event corresponding to the identified event among the measurement report (MR) event associated with the first RAT and the measurement report (MR) event associated with the second RAT. In operation 605, the electronic device 101 may be configured to refrain from performing a measurement report (MR) corresponding to the measurement report event corresponding to the identified event. For convenience of description, refraining from performing a measurement report corresponding to the measurement report event corresponding to the identified event may be expressed as deactivating the measurement report event corresponding to the identified event. As described above, the electronic device 101 may deactivate the measurement report event associated with the first RAT or the measurement report event associated with the second RAT in order to prevent delay and/or interruption of the IMS voice service. The electronic device 101 may store in advance information about a measurement report event corresponding to an event, which is to be deactivated, and may deactivate at least one measurement report event, based on a detected event and the information stored in advance. Various events and various examples of deactivating measurement report events corresponding to the various events will be described later.

In an example, deactivating a measurement report event may refer, for example, to not performing measurement associated with the measurement report event. For example, when event Ax is deactivated, the electronic device 101 may not measure a neighbor cell with respect to the currently connected RAT. In this case, the electronic device 101 may continue to measure a serving cell. For example, measurement at an inter-frequency and measurement at an intra-frequency may not be performed. For example, when event Bx is deactivated, the electronic device 101 may not measure a neighbor cell with respect to an RAT different from the currently connected RAT. In this case, the electronic device 101 may continue to measure the serving cell. For example, measurement in an inter-RAT may not be performed. In another example, deactivating a measurement report event may refer, for example, to measurement being performed but an MR message is not transmitted even though the measurement report event is satisfied. For example, when event Ax is deactivated, the electronic device 101 may not transmit an MR message corresponding to the event to the network even though it is determined that event Ax is satisfied. For example, when event Bx is deactivated, the electronic device 101 may not transmit an MR message corresponding to the event to the network even though it is determined that event Bx is satisfied.

According to various embodiments, the electronic device 101 may perform a procedure associated with the IMS voice service, based on a measurement report event being activated. When at least some of measurement report events other than the deactivated measurement report event are satisfied, the electronic device 101 may transmit a corresponding MR message to the network, thus performing the procedure associated with the IMS voice service, for example, an EPS fallback or return to a 5GS after termination of a call. As an MR is not performed, the procedure associated with the IMS voice service, for example, setting up a dedicated bearer, may not be interrupted. Various examples of performing the procedure associated with the IMS voice service based on the MR according to the activated measurement report event or preventing interruption of the procedure will be described later.

According to various embodiments, even though a condition for deactivating an MR event associated with an RAT of the serving cell is satisfied, the electronic device 101 may deactivate the MR event only when the strength of a signal from the serving cell does not satisfy a specified condition. When the strength of the signal from the serving cell satisfies the specified condition, the electronic device 101 may maintain activation of the MR event even though the condition for deactivating the MR event associated with the RAT of the serving cell is satisfied. For example, when a cell selection criterion according to a measurement result is less than a threshold, the electronic device 101 may determine that the specified condition is satisfied. The cell selection criterion may follow, for example, 3GPP TS 36.304 or 3GPP TS 38.304, but is not limited thereto.

Figure 7A:
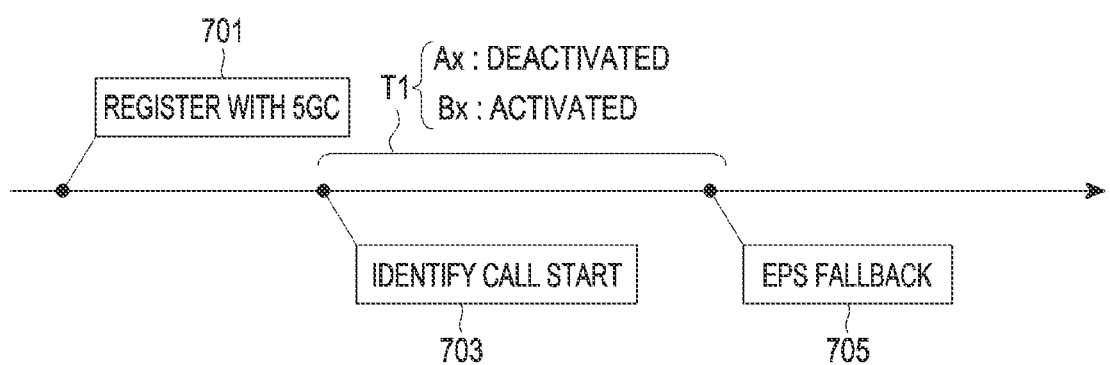
FIG. 7A is a diagram illustrating an example EPS fallback time according to a Call Start according to various embodiments.
Figure 7B:
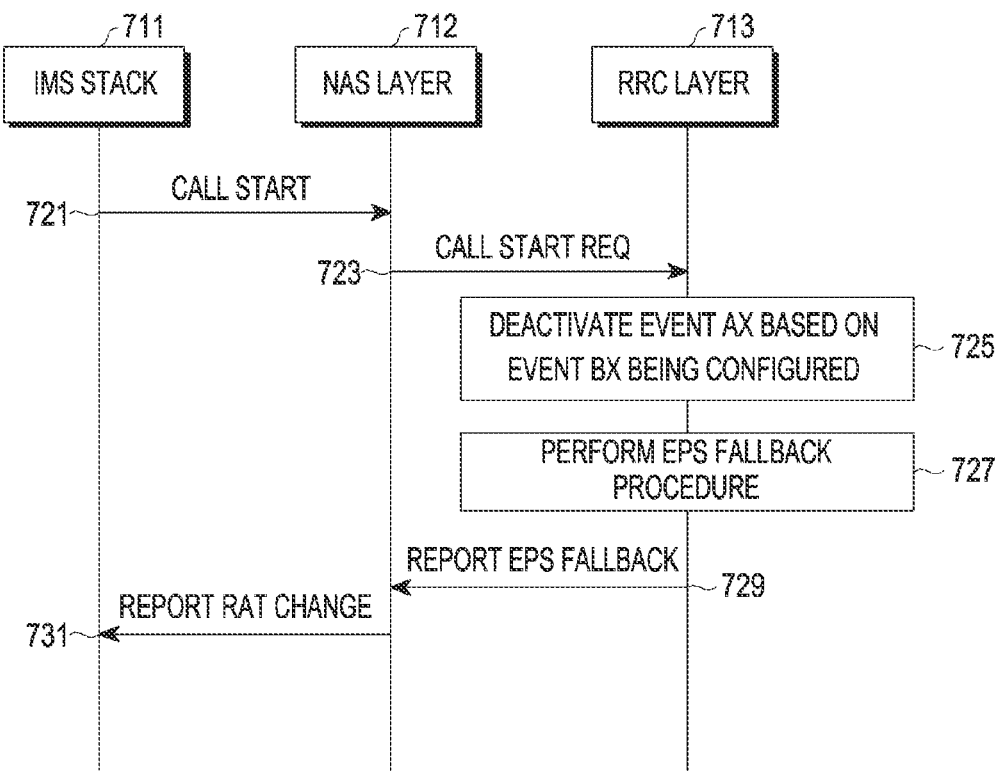
FIG. 7B is a signal flow diagram illustrating example operations of an IMS stack, an NAS layer, and an RRC layer according to various embodiments.

FIG. 7A is a diagram illustrating an example EPS fallback time according to a Call Start according to various embodiments. FIG. 7A will be described with reference to FIG. 7B. FIG. 7B is a signal flow diagram illustrating example operations of an IMS stack, an NAS layer, and an RRC layer according to various embodiments.

According to various embodiments, in operation 701, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may be registered in a 5GC. The electronic device 101 may be registered in the 5GC, for example, based on a registration procedure for the 5GC (e.g., at least some of transmission of a registration request message, reception of a registration accept message, and transmission of a registration complete message), but is not limited thereto. The electronic device 101 may perform the registration procedure based on a cell supporting the 5GC, and may be in any one of a connected state, an idle state, or an inactive state after being registered, without being limited thereto.

According to various embodiments, in operation 703, the electronic device 101 may identify a Call Start. For example, referring to FIG. 7B, in operation 721, the IMS stack 711 may provide a Call Start to the NAS layer 712. The Call Start may include, for example, any one of an RAT (e.g., NR) and a call type (e.g., a voice call, a video call, and an emergency call) but is not limited thereto. In operation 723, the NAS layer 712 may provide a Call Start Request to the RRC layer 713 in response to the received Call Start. The Call Start Request may include, for example, information about an RAT (e.g., NR) but is not limited thereto. The electronic device 101 may identify the Call Start based on, for example, at least one of provision of the Call Start by the IMS stack 711, reception of the Call Start by the NAS layer 712, provision of the Call Start Request by the NAS layer 712, and reception of the Call Start Request by the RRC layer 713, but there is no limitation on an event for identifying the Call Start According to various embodiments, in operation 705, the electronic device 101 may perform an EPS fallback. The electronic device 101 may deactivate event Ax and may activate event Bx during a period (e.g., T1 in FIG. 7A) from when the Call Start is identified to when the EPS fallback is completed. Here, event Ax may be, for example, an event associated with inter-frequency measurement and/or intra-frequency measurement associated with NR, and event Bx may be, for example, an event associated with inter-RAT measurement associated with an RAT other than NR. As event Ax is deactivated, a handover to a different NR cell may be prevented, thus preventing a delay in the EPS fallback. For example, in operation 725, the RRC layer 713 may deactivate event Ax, based on event Bx event being configured. In operation 727, the RRC layer 713 may perform an EPS fallback procedure, which may be the same, for example, as described with reference to FIG. 3 or FIG. 5. In operation 729, the RRC layer 713 may complete the EPS fallback and may notify the NAS layer 712 that the EPS fallback has been completed. In operation 731, the NAS layer 712 may notify the IMS stack 711 that the RAT has been changed. The electronic device 101 may stop deactivating Ax event, based on completion of the EPS fallback and may transmit an MR message corresponding to event Ax. In an example, the electronic device 101 may identify reception of an RRC release message for a redirection or reception of a handover command as an event indicating the completion of the EPS fallback, but is not limited thereto. The electronic device 101 may also reactivate the deactivated event Ax, not only based on the RRC layer 713 receiving the message but also based on any one of the RRC layer 713 notifying the NAS layer 712 that the EPS fallback has been completed, the NAS layer 712 identifying that the EPS fallback has been completed, the NAS layer 712 notifying the IMS stack 711 that the RAT has been changed, or the IMS stack 711 identifying that the RAT has been changed, and there is no limitation on an event for reactivating event Ax. As described above, the electronic device 101 may deactivate event Ax only when the strength of a signal from a serving cell does not satisfy a specified condition. It will be understood by those skilled in the art that event Ax may be deactivated, for example, when the strength of the signal from a serving cell does not satisfy the specified condition in various embodiments of the disclosure.

Figure 7C:
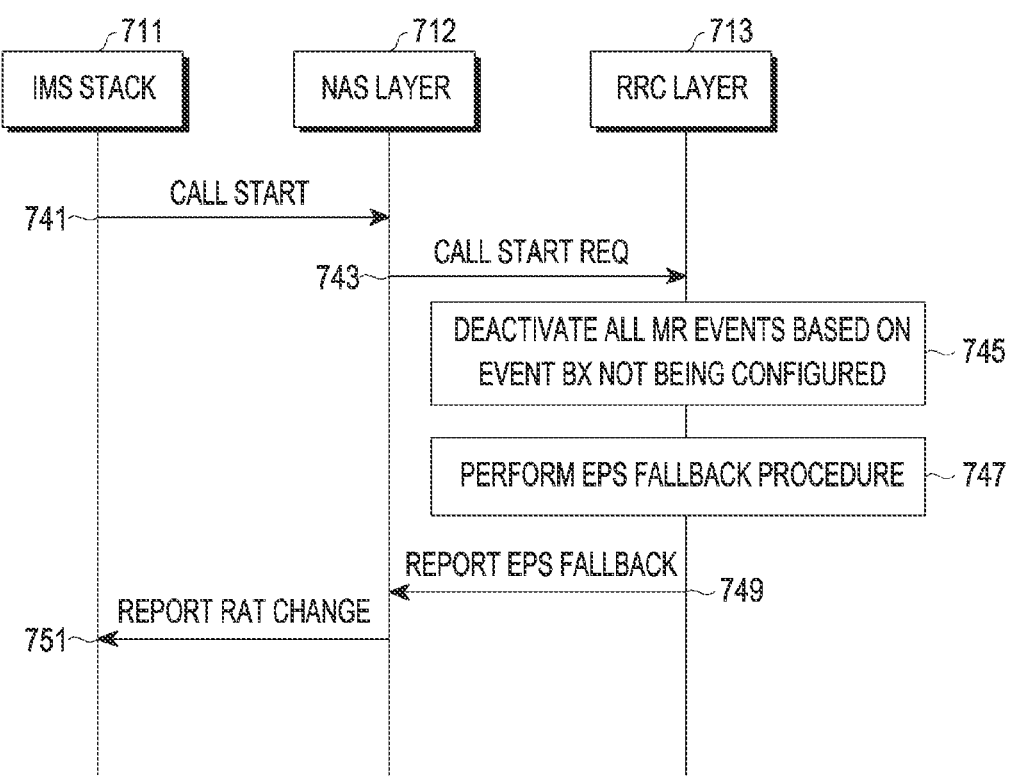
FIG. 7C is a signal flow diagram illustrating example operations of an IMS stack, an NAS layer, and an RRC layer according to various embodiments.

FIG. 7C is a signal flow diagram illustrating example operations of an IMS stack, an NAS layer, and an RRC layer according to various embodiments.

According to various embodiments, in operation 741, the IMS stack 711 may provide a Call Start to the NAS layer 712. The Call Start may include, for example, any one of an RAT (e.g., NR) and a call type (e.g., a voice call, a video call, and an emergency call) but is not limited thereto. In operation 743, the NAS layer 712 may provide a Call Start Request to the RRC layer 713 in response to the received Call Start. The Call Start Request may include, for example, information about an RAT (e.g., NR) but is not limited thereto. In operation 745, the RRC layer 713 may deactivate all MR events, based on Bx event not being configured. In operation 747, the RRC layer 713 may perform an EPS fallback procedure. In operation 749, the RRC layer 713 may complete the EPS fallback and may notify the NAS layer 712 that the EPS fallback has been completed. In operation 751, the NAS layer 712 may notify the IMS stack 711 that an RAT has been changed. Similarly to FIG. 7B, the electronic device 101 may reactivate the deactivated MR events, based on the EPS fallback, and there is no limitation on a trigger for the reactivation.

Figure 8:
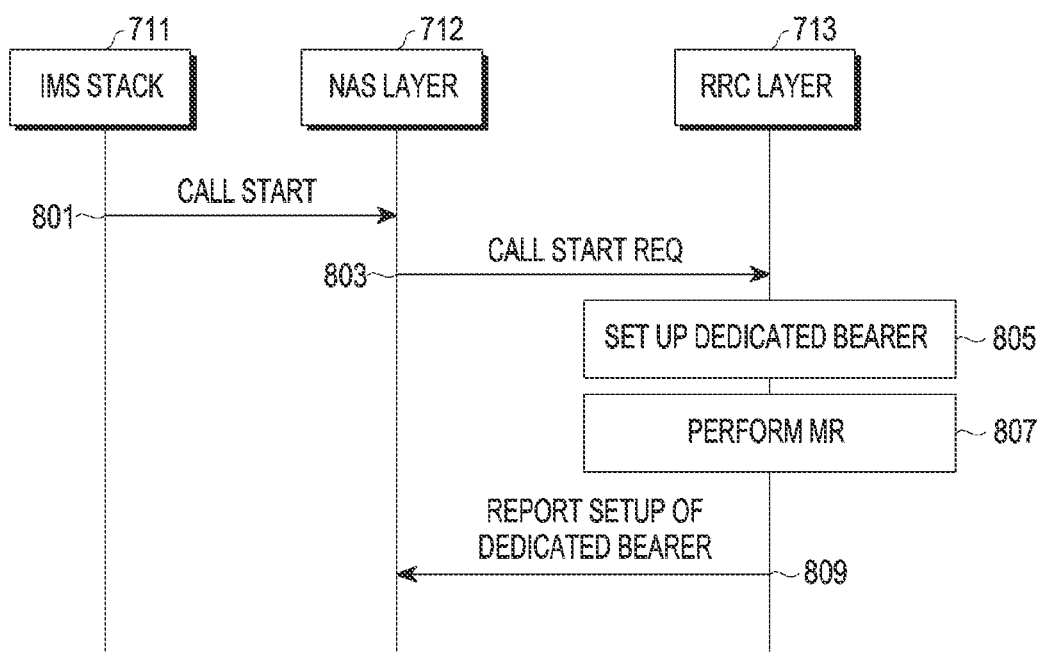
FIG. 8 is a signal flow diagram illustrating example operations of an IMS stack, an NAS layer, and an RRC layer according to various embodiments.

FIG. 8 is a signal flow diagram illustrating example operations of an IMS stack, an NAS layer, and an RRC layer according to various embodiments.

According to various embodiments, in operation 801, the IMS stack 711 may provide a Call Start to the NAS layer 712. The Call Start may include, for example, any one of an RAT (e.g., NR) and a call type (e.g., a voice call, a video call, and an emergency call) but is not limited thereto. In operation 803, the NAS layer 712 may provide a Call Start Request to the RRC layer 713 in response to the received Call Start. The Call Start Request may include, for example, information about an RAT (e.g., NR) but is not limited thereto. In operation 805, the RRC layer 713 may set up a dedicated bearer in currently connected NR depending on a configuration. In this case, in operation 807, the RRC layer 713 may transmit an MR message corresponding to a measurement report event configured without any particular limitation. When the dedicated bearer is set up in the NR depending on the configuration, the RRC layer 713 may deactivate event Bx. In operation 809, the RRC layer 713 may notify the NAS layer 712 of set up of the dedicated bearer. In this case, information indicating that an RAT is the NR may be included in a notification of the setup of the dedicated bearer.

Figure 9A:
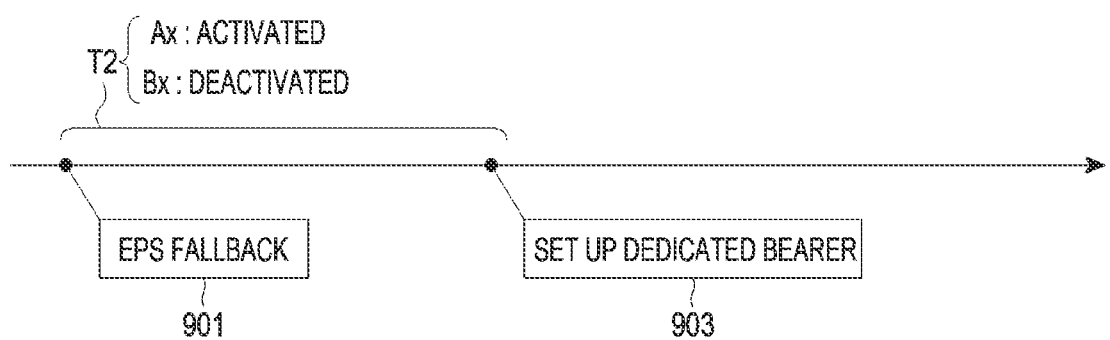
FIG. 9A is a diagram illustrating example setup of a dedicated bearer after an EPS fallback according to various embodiments.
Figure 9B:
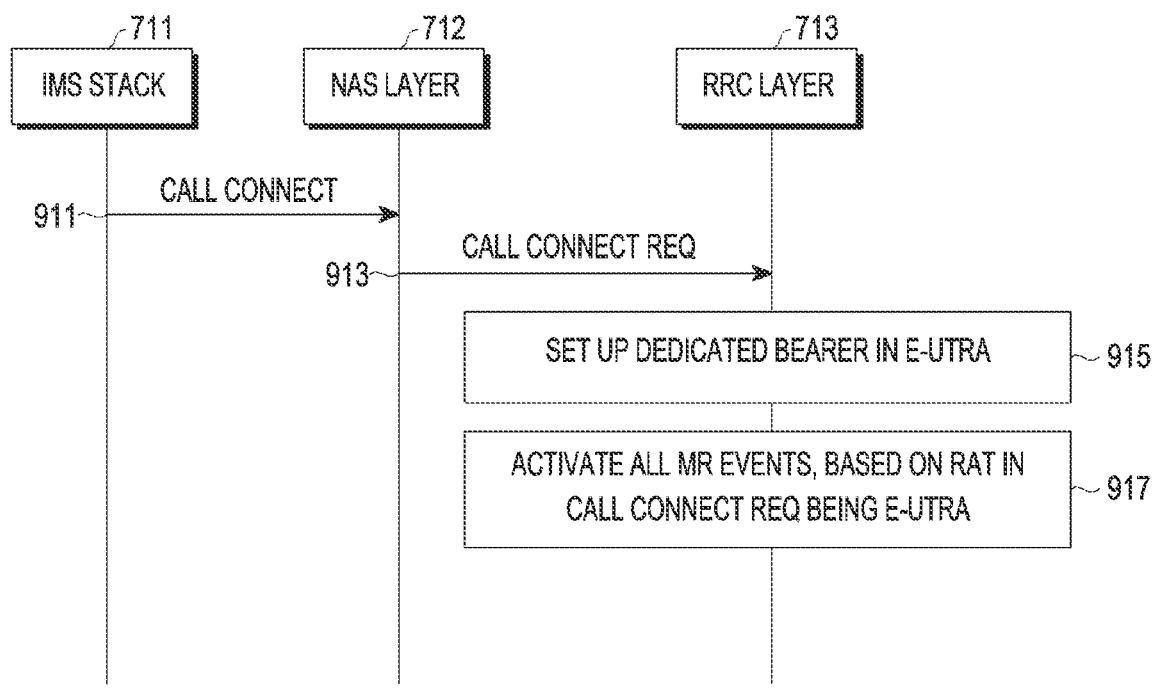
FIG. 9B is a signal flow diagram illustrating example operations of an IMS stack, an NAS layer, and an RRC layer according to various embodiments.

FIG. 9A is a diagram illustrating example setup of a dedicated bearer after an EPS fallback according to various embodiments. FIG. 9A will be described with reference to FIG. 9B. FIG. 9B is a signal flow diagram illustrating example operations of an IMS stack, an NAS layer, and an RRC layer according to various embodiments.

According to various embodiments, in operation 901, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may perform and complete an EPS fallback. For example, as described above, completion of the EPS fallback may be determined by reception of an RRC release message including redirection information or reception of a handover command, but is not limited thereto, and may also be determined by transmission and reception of information in the above layers or stack. As described with reference to FIG. 3, after the EPS fallback, the electronic device 101 may set up a dedicated bearer, based on an eNB 303 and/or an EPC 305. In operation 903, the electronic device 101 may complete setup of the dedicated bearer.

According to various embodiments, after the EPS fallback is performed, event Bx may be deactivated during a period (e.g., T2 of FIG. 9A) before the dedicated bearer is set up. When event Bx is not deactivated, the electronic device 101 may transmit an MR message corresponding to event Bx to a network. The network may transmit an RRC release message for a redirection to NR or a handover command for a handover to the NR, based on the received MR message. The electronic device 101 may connect back to the NR, based on the message received from the network. As the electronic device 101 returns back to the NR before the dedicated bearer is established, a call connection may be likely to be delayed. As event Bx is deactivated, the electronic device 101 may be prevented from being handed over back to the NR until the dedicated bearer is set up after the EPS fallback is performed. When the dedicated bearer is completely set up, the electronic device 101 may reactivate the deactivated event Bx. For example, the electronic device 101 may reactivate event Bx upon receiving a dedicated bearer accept message, and there is not limitation on a trigger for reactivating event Bx. As described above, the electronic device 101 may deactivate event Bx only when the strength of a signal from a serving cell does not satisfy a specified condition. It will be understood by those skilled in the art that event Bx may be deactivated, for example, when the strength of the signal from a serving cell does not satisfy the specified condition in various embodiments of the disclosure.

For example, referring to FIG. 9B, in operation 911, the IMS stack 711 may provide a Call Connect to the NAS layer 712. The Call Connect may include information about an RAT and/or information about a call type. When a change of RAT according to the EPS fallback is notified to the IMS stack 711 as in FIG. 7B, the IMS stack 711 may provide a Call Connect including information indicating an E-UTRA to the NAS layer 712. When the dedicated bearer in the NR is set up as in FIG. 8, the IMS stack 711 may provide a Call Connect including information indicating the NR to the NAS layer 712. In operation 913, the NAS layer 712 may provide a Call Connect Request to the RRC layer 713. The Call Connect Request may include the information about the RAT. In operation 915, the RRC layer 713 may set up a dedicated bearer in the E-UTRA, based on the Call Connect Request, and a trigger for setting up the dedicated bearer is not limited to the Call Connect Request from the NAS layer 712. In operation 917, the electronic device 101 may activate all measurement report events, based on the RAT in the Call Connect Request being the E-UTRA. For example, the electronic device 101 may reactivate the deactivated event Bx after the dedicated bearer in the E-UTRA is set up. As illustrated in FIG. 8, when the dedicated bearer in the NR is set up, the electronic device 101 may not deactivate a measurement report event.

Figure 10A:
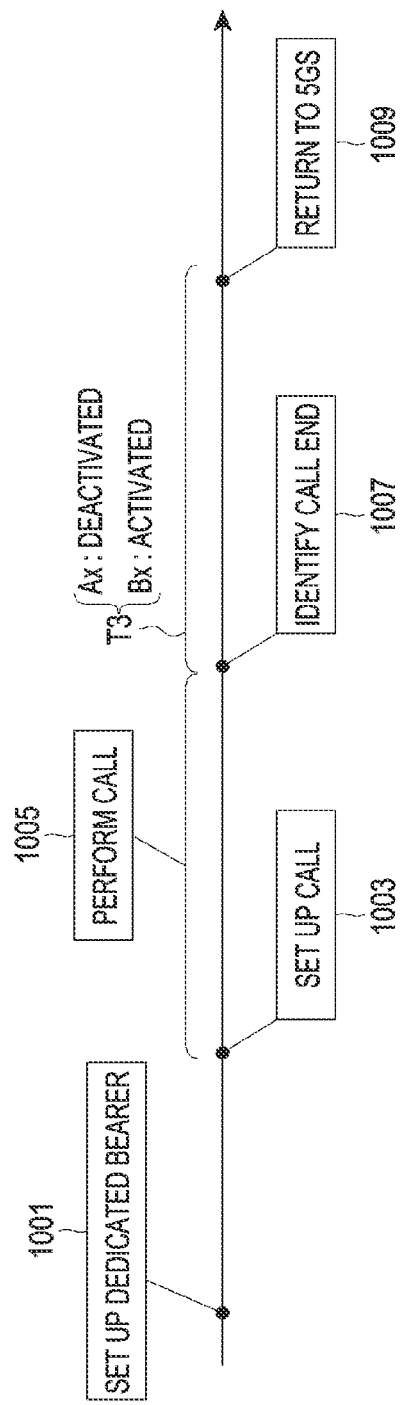
FIG. 10A is a diagram illustrating an example return to a 5GS after setup of a dedicated bearer and termination of a call according to various embodiments.
Figure 10B:
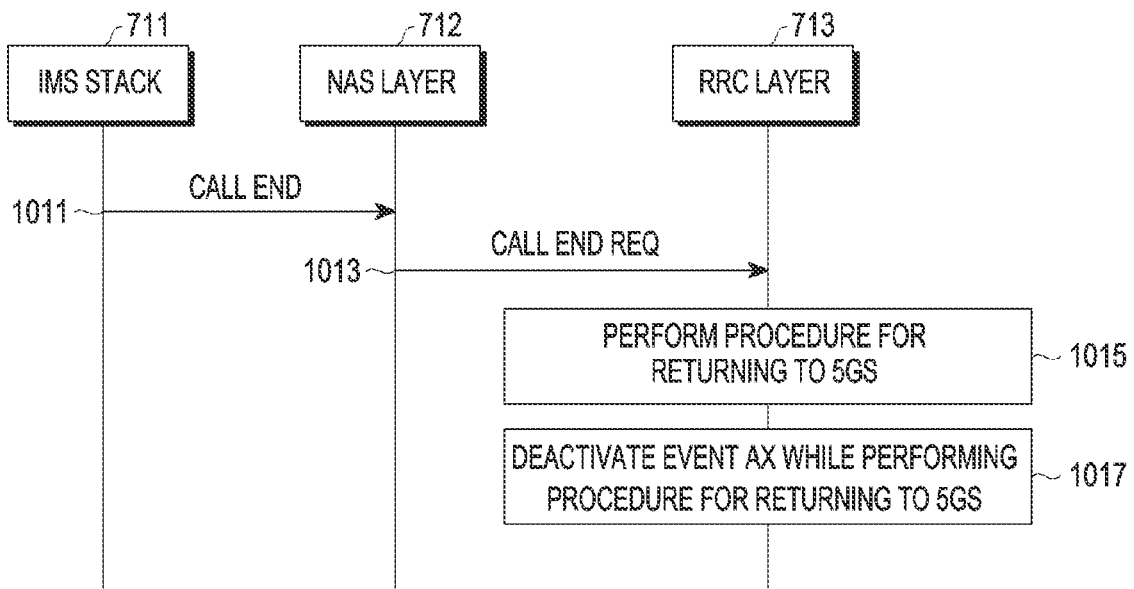
FIG. 10B is a signal flow diagram illustrating example operations of an IMS stack, an NAS layer, and an RRC layer according to various embodiments.

FIG. 10A is a diagram illustrating an example return to a 5GS after setup of a dedicated bearer and termination of a call according to various embodiments. FIG. 10A will be described with reference to FIG. 10B. FIG. 10B is a signal flow diagram illustrating example operations of an IMS stack, an NAS layer, and an RRC layer according to various embodiments.

According to various embodiments, in operation 1001, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may set up a dedicated bearer for VoLTE with an EPS fallback performed. In operation 1003, the electronic device 101 may set up a call. In operation 1005, the electronic device 101 may perform the call, based on the call that is set up. For example, the electronic device 101 may transmit and receive a packet (e.g., an RTP packet) to and from a counterpart device. In operation 1007, the electronic device 101 may identify a Call End. For example, the electronic device 101 may identify the Call End, based on reception of an SIP-based BYE message. For example, the electronic device 101 may identify the Call End, based on expiration of an RTP timer. For example, the electronic device 101 may identify the Call End, based on a call termination input from a user, and there is no limitation on an event corresponding to the Call End.

According to various embodiments, in operation 1009, the electronic device 101 may return to a 5GS, based on the Call End. The electronic device 101 may deactivate event Ax and may activate event Bx during a period (e.g., T3 in FIG. 10A) from when the Call End is identified to when the electronic device 101 returns to the 5GS. When event Ax is not deactivated, the electronic device 101 may perform a measurement report corresponding to event Ax before returning to the 5GS. Since the electronic device 101 is currently connected to an E-UTRA cell according to an EPS, the measurement report corresponding to event Ax may be associated with an E-UTRA neighbor cell. A network may transmit a message for a redirection or a handover corresponding to the measurement report to the electronic device 101. In this case, the electronic device 101 may perform a redirection or handover to the E-UTRA cell even though needing to return to the 5GS, thus delaying the return to the 5GS. As the electronic device 101 deactivates event Ax, the redirection or handover to the E-UTRA cell is not performed, and thus the return to the 5GS may not be delayed. For example, when completely returning to the 5GS, the electronic device 101 may reactivate the deactivated event Ax. For example, the electronic device 101 may reactivate the deactivated event Ax, based on reception of an RRC release message causing a redirection to NR or reception of a handover command causing a handover to the NR. However, there is no limitation on a trigger for reactivating event Ax, and the trigger may include various examples, for example, completion of registration in the 5GC.

For example, referring to FIG. 10B, in operation 1011, the IMS stack 711 may provide a Call End to the NAS layer 712. The Call End may include, for example, information about an RAT and/or information on a call type but is not limited thereto. The information about the RAT may be, for example, information indicating the E-UTRA. In operation 1013, the NAS layer 712 may provide a Call End Request to the RRC layer 713, based on the received Call End. The Call End Request may include, for example, the information about the RAT. The information about the RAT may be, for example, the information indicating the E-UTRA. In operation 1015, the RRC layer 713 may perform a procedure for returning to the 5GS. In operation 1017, the RRC layer 713 may deactivate event Ax while performing the procedure for returning to the 5GS. The RRC layer 713 may reactivate event Ax, based on an event indicating completion of the return to the 5GS.

Figure 11A:
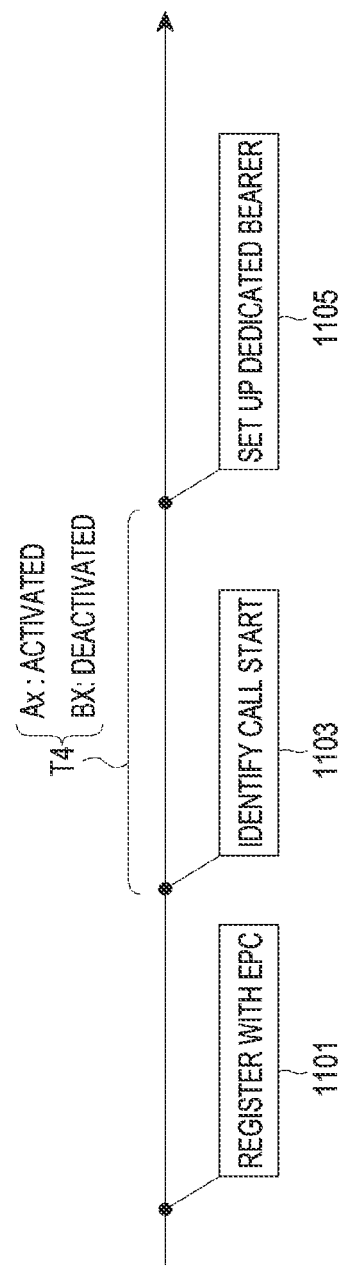
FIG. 11A is a diagram illustrating example setup of a dedicated bearer according to a Call Start in a state of being registered in an EPC according to various embodiments.
Figure 11B:
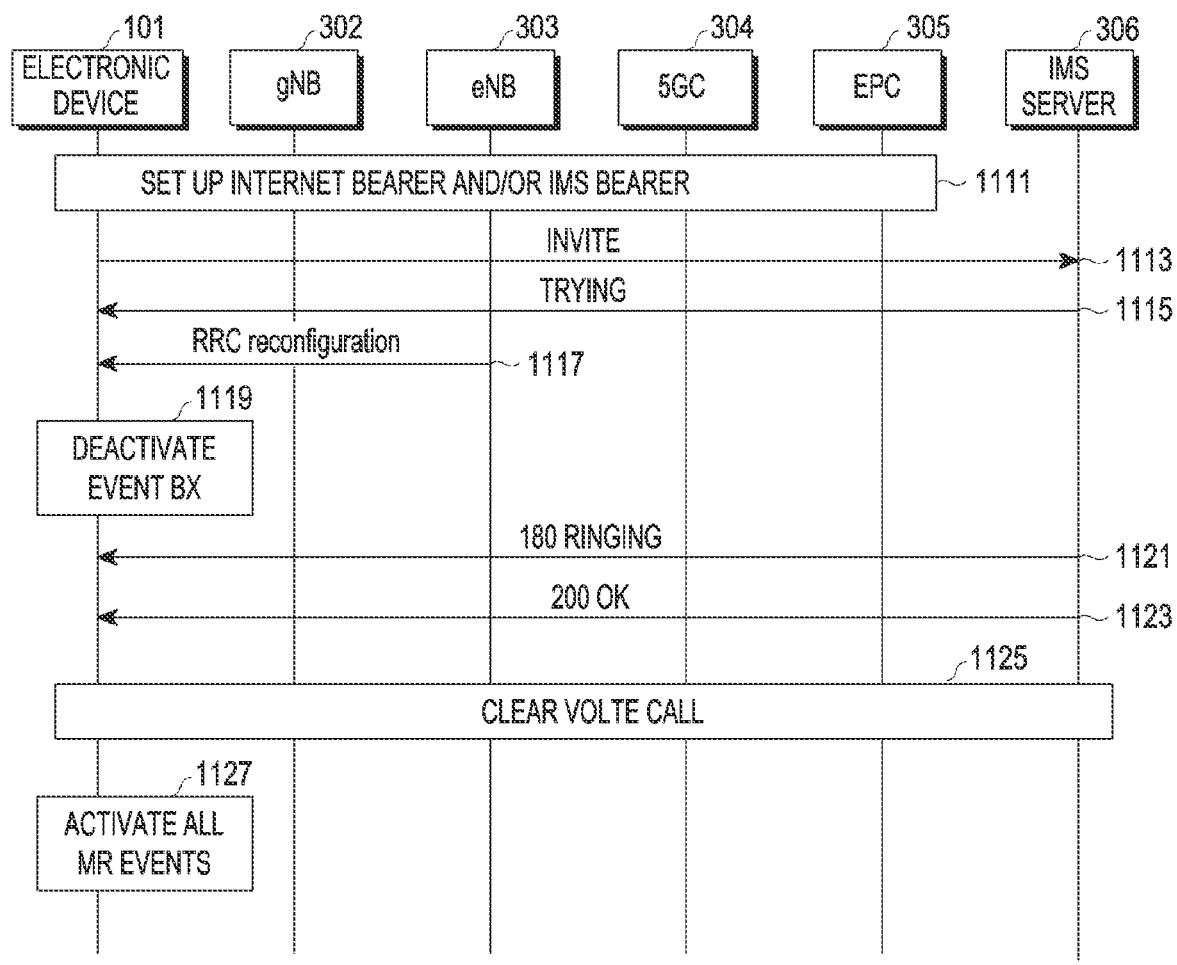
FIG. 11B is a signal flow diagram illustrating example operations of an electronic device and a network according to various embodiments.

FIG. 11A is a diagram illustrating example setup of a dedicated bearer according to a Call Start in a state of being registered in an EPC according to various embodiments. FIG. 11A will be described with reference to FIG. 11B. FIG. 11B is a signal flow diagram illustrating example operations of an electronic device and a network according to various embodiments.

According to various embodiments, in operation 1101, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may be in a state of being registered in an EPC. For example, the electronic device 101 may be in a state of being connected to an E-UTRA cell. The electronic device 101 may identify a Call Start in the state of being connected to the E-UTRA cell. In this case, it is assumed that the electronic device 101 does not need to perform a system fallback. In operation 1103, the electronic device 101 may identify the Call Start. The Call Start may be identified, for example, as described with reference to FIG. 7A and FIG. 7B. After identifying the Call Start, the electronic device 101 may set up a dedicated bearer for VoLTE in operation 1105. Subsequently, the electronic device 101 may perform a call, based on the dedicated bearer.

According to various embodiments, the electronic device 101 may activate event Ax and may deactivate event Bx during a period (e.g., T4 in FIG. 11A) from when the Call Start is identified to when the dedicated bearer is set up. When event Bx is not deactivated, the electronic device 101 may perform a measurement report corresponding to event Bx before setting up the dedicated bearer. Since the electronic device 101 is currently connected to the E-UTRA cell according to the EPS, the measurement report corresponding to event Bx may be associated with an NR neighbor cell. A network may transmit a message for a redirection or a handover corresponding to the measurement report to the electronic device 101. In this case, the electronic device 101 may perform a redirection or a handover to an NR cell even though needing to set up the dedicated bearer in the EPS, thus delaying a call. As the electronic device 101 deactivates event Bx, the redirection or handover to the NR cell is not performed, and thus the call may not be delayed. For example, when the dedicated bearer is set up, the electronic device 101 may reactivate the deactivated event Bx. For example, the electronic device 101 may reactivate the deactivated event Bx, based on reception of a dedicated bearer accept message. However, there is no limitation on a trigger for reactivating event Bx.

For example, referring to FIG. 11B, in operation 1111, the electronic device 101 may set up an Internet bearer (or a PDN connection of an Internet APN) and/or an IMS bearer (or a PDN connection of an IMS APN), based on an EPC 305. In operation 1113, the electronic device 101 may transmit an INVITE message to an IMS server 306, based on the at least one bearer that is set up. In operation 1115, the electronic device 101 may receive a TRYING message from the IMS server 306. In operation 1117, the electronic device 101 may receive an RRC reconfiguration message from an eNB 303. It will be understood by those skilled in the art that there is no limitation on the reception time of the RRC reconfiguration message. The electronic device 101 may configure a plurality of measurement report events, based on information included in the RRC reconfiguration message.

According to various embodiments, in operation 1119, the electronic device 101 may deactivate event Bx. As described above, the electronic device 101 may deactivate event Bx, based on identification of a Call Start in a state of being registered in the EPC. Accordingly, an MR message corresponding to event Bx may not be transmitted to the network (e.g., the eNB 303), thereby preventing the electronic device 101 from being redirected or handed over to a gNB 302. In operation 1121, the electronic device 101 may receive a 180 RINGING message in a state of being connected to the EPC 305 and the eNB 303. In operation 1123, the electronic device 101 may receive a 200 OK message. In operation 1125, the electronic device 101 may clear a VoLTE call. In operation 1127, the electronic device 101 may activate all configured MR events. For example, the electronic device 101 may reactivate event Bx that has been deactivated, based on setup of a dedicated bearer, but there is no limitation on a reactivation trigger.

Figure 12A:
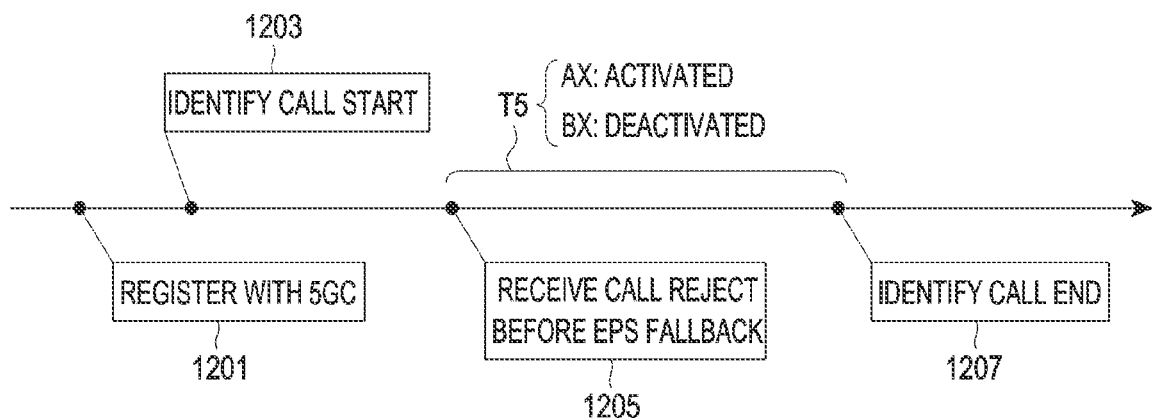
FIG. 12A is a diagram illustrating an example call rejection process according to various embodiments.
Figure 12B:
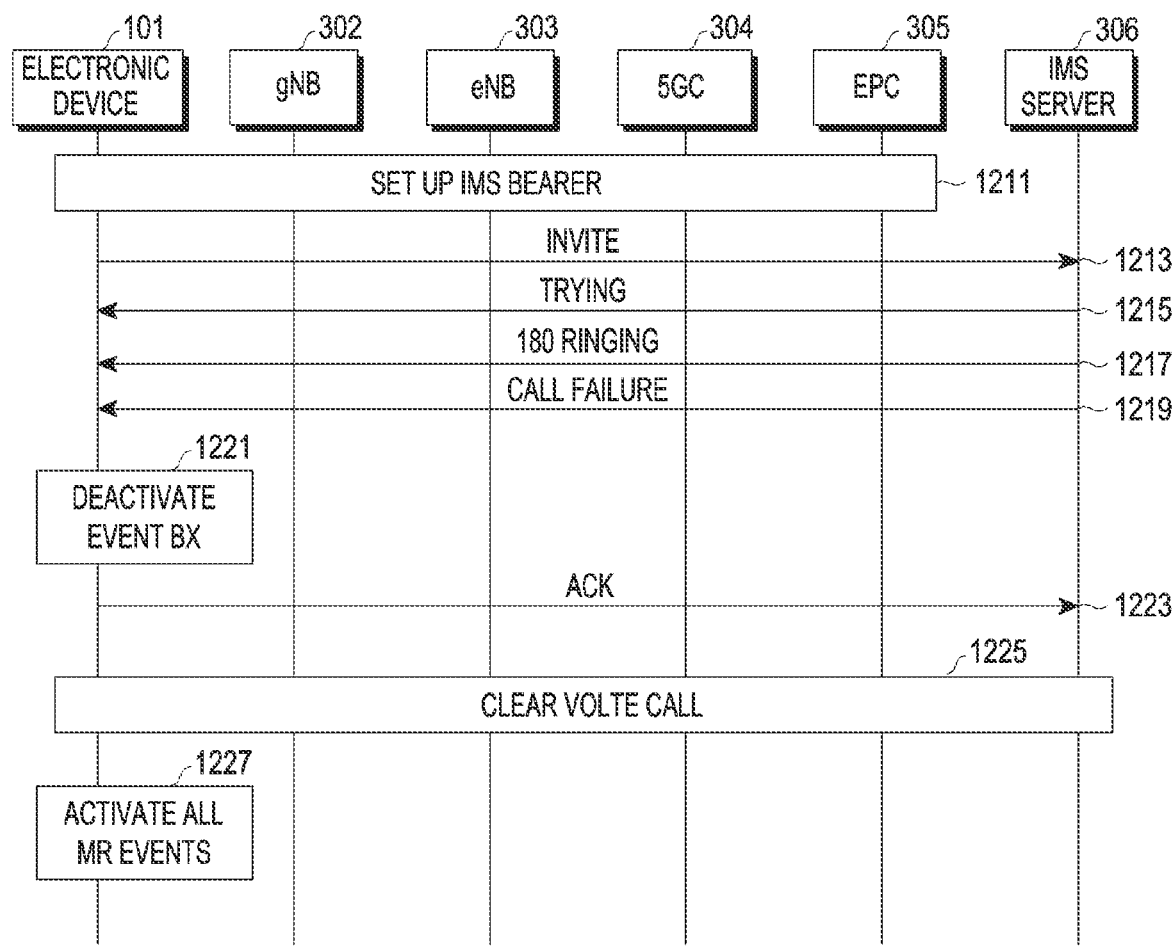
FIG. 12B is a signal flow diagram illustrating example operations of an electronic device and a network according to various embodiments.

FIG. 12A is a diagram illustrating an example call rejection process according to various embodiments. FIG. 12A will be described with reference to FIG. 12B. FIG. 12B is a signal flow diagram illustrating example operations of an electronic device and a network according to various embodiments.

According to various embodiments, in operation 1201, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may be in a state of being registered in a 5GC. For example, the electronic device 101 may be in a state of being connected to an NR cell. The electronic device 101 may identify a Call Start in the state of being connected to the NR cell. In operation 1203, the electronic device 101 may identify the Call Start. The Call Start may be identified as described with reference to FIG. 7A and FIG. 7B. The electronic device 101 needs to perform an EPS fallback for an IMS voice service after identifying the Call Start. In operation 1205, the electronic device 101 may receive a Call Reject message before completing the EPS fallback. The Call Reject message may be, for example, based on an SIP but is not limited thereto. For example, the electronic device 101 may identify a Call Reject upon receiving a 603 Decline message. For example, the electronic device 101 may identify the Call Reject upon receiving a 183 Session Progress message.

According to various embodiments, the electronic device 101 may activate event Ax and may deactivate event Bx upon receiving the Call Reject before the EPS fallback. As a call is rejected, the electronic device 101 may maintain a connection to NR. However, when event Bx is activated, the electronic device 101 may perform a measurement report corresponding to event Bx. Since the electronic device 101 is currently connected to an NR cell according to the NR, the measurement report corresponding to event Bx may be associated with an E-UTRA neighbor cell. A network may transmit a message for a redirection or a handover corresponding to the measurement report to the electronic device 101. In this case, the electronic device 101 may perform a redirection or handover to an E-UTRA cell. As the electronic device 101 deactivates event Bx, the redirection or handover to the E-UTRA cell is not performed, and thus the call may not be delayed.

For example, in operation 1207, the electronic device 101 may reactivate event Bx that has been deactivated, based on identification of a Call End. For example, the electronic device 101 may reactivate event Bx, based on identification of a Call End event in an IMS stack. Accordingly, event Bx may be deactivated during a period (e.g., T5 of FIG. 12A) from when the Call Reject is identified to when the Call End event is identified.

For example, referring to FIG. 12B, in operation 1211, the electronic device 101 may set up an IMS bearer (or a PDU session of an IMS DNN (or QoS flow)), based on a 5GC 304. In operation 1213, the electronic device 101 may transmit an INVITE message to an IMS server 306, based on the at least one bearer that is set up. In operation 1215, the electronic device 101 may receive a TRYING message from the IMS server 306. In operation 1217, the electronic device 101 may receive a 180 RINGING message from the IMS server 306. In operation 1219, the electronic device 101 may receive a Call Fail message (e.g., a 603 Decline message or 183 Session Progress message) from the IMS server 306. In operation 1221, the electronic device 101 may deactivate event Bx configured based on identification of a Call Fail. In operation 1223, the electronic device 101 may transmit an ACK message to the IMS server 306. In operation 1225, the electronic device 101 may clear a VoLTE call. In operation 1227, the electronic device 101 may activate all configured MR events. For example, the electronic device 101 may reactivate event Bx that has been deactivated, based on identification of a Call End event.

Figure 13A:
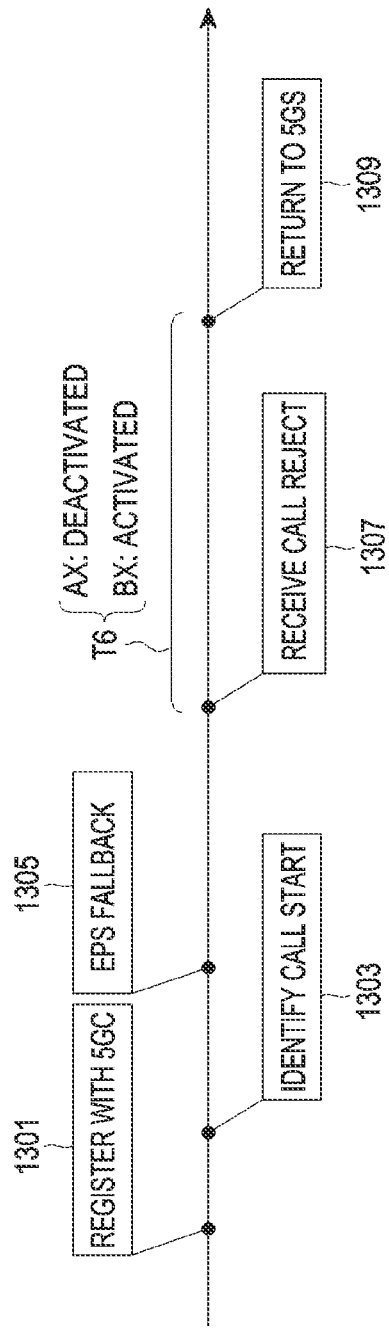
FIG. 13A is a diagram illustrating an example call rejection process according to various embodiments.
Figure 13B:
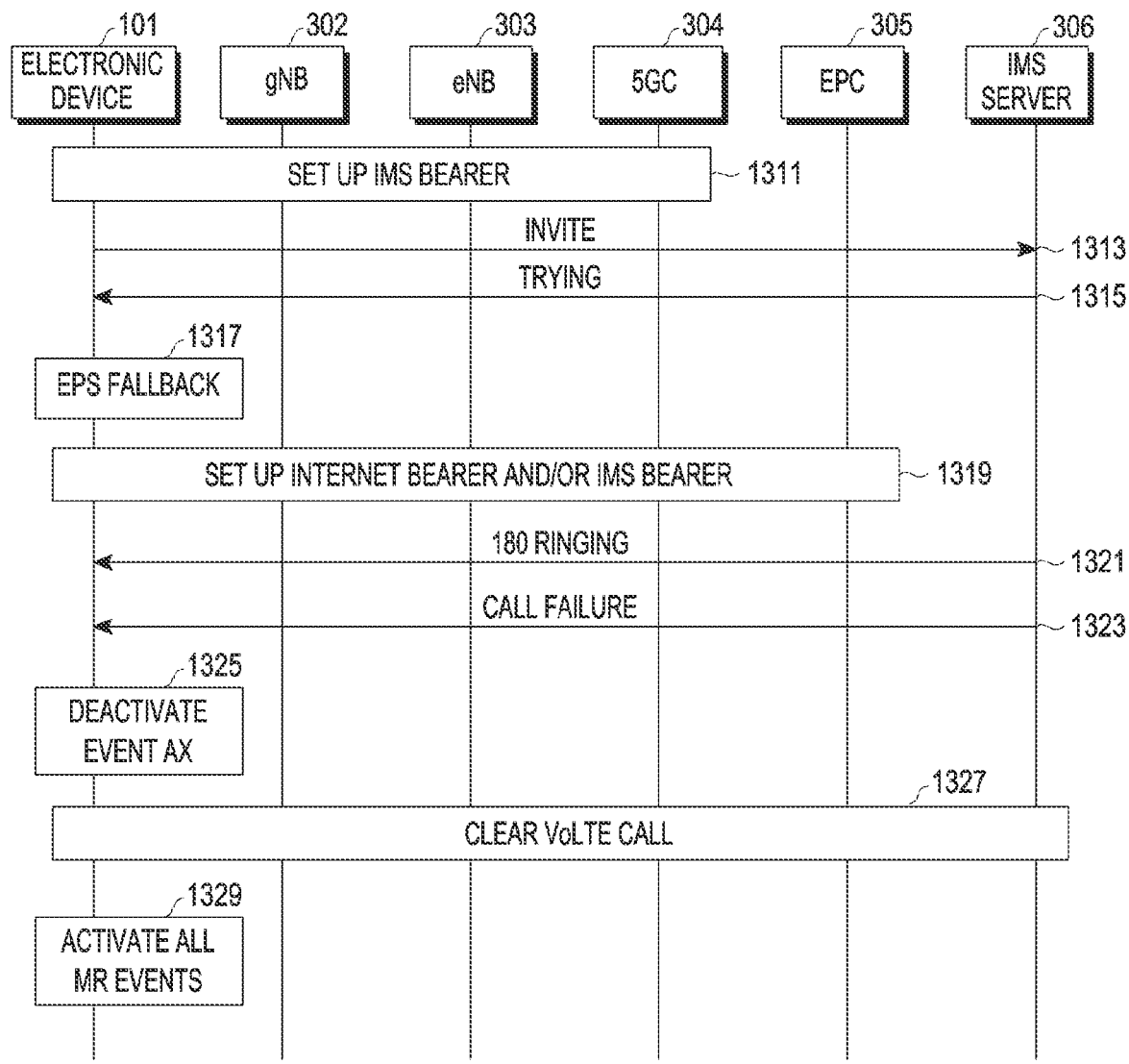
FIG. 13B is a signal flow diagram illustrating example operations of an electronic device and a network according to various embodiments.

FIG. 13A is a diagram illustrating an example call rejection process according to various embodiments. FIG. 13A will be described with reference to FIG. 13B. FIG. 13B is a signal flow diagram illustrating example operations of an electronic device and a network according to various embodiments.

According to various embodiments, in operation 1301, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may be in a state of being registered in a 5GC. For example, the electronic device 101 may be in a state of being connected to an NR cell. The electronic device 101 may identify a Call Start in the state of being connected to the NR cell. In operation 1303, the electronic device 101 may identify the Call Start. The Call Start may be identified as described with reference to FIG. 7A and FIG. 7B. In operation 1305, the electronic device 101 may perform an EPS fallback for an IMS voice service after identifying the Call Start. In operation 1307, the electronic device 101 may receive a Call Reject message after the EPS fallback. The Call Reject message may be, for example, based on an SIP but is not limited thereto. For example, the electronic device 101 may identify a Call Reject upon receiving a 603 Decline message. For example, the electronic device 101 may identify the Call Reject upon receiving a 183 Session Progress message.

According to various embodiments, the electronic device 101 may deactivate event Ax and may activate event Bx upon receiving the Call Reject after the EPS fallback. As a call is rejected, the electronic device 101 needs to quickly return to the 5GS. When event Ax is activated, the electronic device 101 may perform a measurement report based on the result of measurement result on a different E-UTRA cell in a state of being connected to an E-UTRA cell, which is an EPS fallback state. In an example, the electronic device 101 may preferentially measure an NR frequency before the EPS fallback. According to the measurement report, a network may redirect or hand over the electronic device 101 to the different E-UTRA cell. Accordingly, the electronic device 101 may be redirected or handed over to the different E-UTRA cell despite needing to return to the 5GS. As event Ax is deactivated, the electronic device 101 may be prevented from being redirected or handed over to the different E-UTRA cell, thus enabling a quick return to the 5GS. Accordingly, the electronic device 101 may return to the 5GS in operation 1309. The electronic device 101 may deactivate event Ax during a period (e.g., T6 in FIG. 13A) from when the Call Reject is identified to when the electronic device 101 returns to the 5GS. The electronic device 101 may reactivate event Ax after returning to the 5GS. For example, the reactivation time of event Ax may be the reception time of an RRC release message for returning to the 5GS or the reception time of a handover command but is not limited thereto.

For example, referring to FIG. 13B, in operation 1311, the electronic device 101 may set up an IMS bearer (or a PDU session of an IMS DNN (or QoS flow)), based on a 5GC 304. In operation 1313, the electronic device 101 may transmit an INVITE message to an IMS server 306, based on the at least one bearer that is set up. In operation 1315, the electronic device 101 may receive a TRYING message from the IMS server 306. In operation 1317, the electronic device 101 may perform an EPS fallback, for example, based on reception of the TRYING message as illustrated in FIG. 5. In operation 1319, the electronic device 101 may establish an Internet bearer (or a PDN connection of an Internet APN) and/or an IMS bearer (or a PDN connection of an IMS APN), based on an eNB 303 and/or an EPC 305 after the EPS fallback. In operation 1321, the electronic device 101 may receive a 180 RINGING message from the IMS server 306. In operation 1323, the electronic device 101 may receive a Call Fail message (e.g., a 603 Decline message or 183 Session Progress message) from the IMS server 306. In operation 1325, the electronic device 101 may deactivate event Ax, based on identification of a Call Fail. In operation 1327, the electronic device 101 may clear a VoLTE call. In operation 1329, the electronic device 101 may activate all MR events. For example, the electronic device 101 may reactivate all MR events, based on return to a 5GS.

Figure 14:
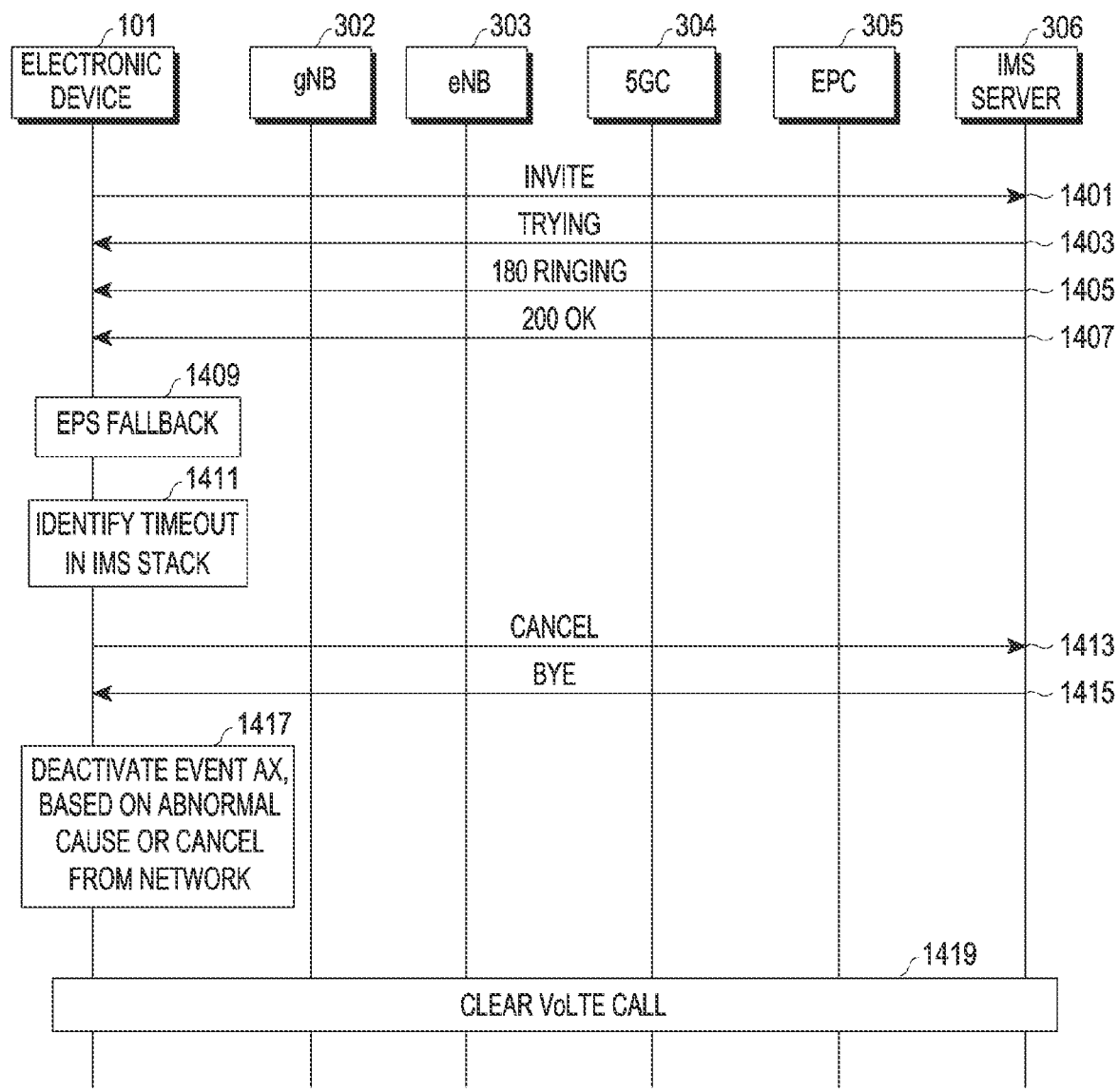
FIG. 14 is a signal flow diagram illustrating an example method of operating an electronic device according to various embodiments.

FIG. 14 is a signal flow diagram illustrating an example method of operating an electronic device according to various embodiments.

According to various embodiments, in operation 1401, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may transmit an INVITE message to an IMS server 306. In operation 1403, the IMS server 306 may transmit a TRYING message to the electronic device 101 in response to the received INVITE message. An MT terminal may transmit a 180 RING message to the IMS server 306, and the IMS server 306 may transmit the 180 RING message to the electronic device 101 in operation 1405. When the MT terminal performs an answer, a 200 OK message may be transmitted from the MT terminal to the electronic device 101 through the IMS server 306 in operation 1407.

According to various embodiments, in operation 1409, the electronic device 101 may perform an EPS fallback. In operation 1411, the electronic device 101 may identify a timeout in an IMS stack. In operation 1413, the electronic device 101 may transmit a CANCEL message to the IMS server 306, based on the identified timeout. In operation 1415, the electronic device 101 may receive a BYE message from the IMS server 306. In operation 1415, the electronic device 101 may receive a CANCEL message from the IMS server 306 instead of the BYE message. The CANCEL message and/or the BYE message may be based on an SIP but is not limited thereto. According to an example configuration, either operation 1413 of transmitting the CANCEL message or operation 1415 of receiving the BYE message may be performed. The BYE message may include, for example, an abnormal cause. In operation 1417, the electronic device 101 may deactivate event Ax, based on the abnormal cause identified from the BYE message. When the abnormal cause occurs, the electronic device 101 needs to quickly return to a 5GS. However, when event Ax is activated, the electronic device 101 may perform an MR for event Ax, thus delaying return to the 5GS. As event Ax is deactivated, the electronic device 101 may be prevented from being redirected or handed over a different E-UTRA cell. The electronic device 101 may deactivate event Ax, based on reception of the CANCEL message from a network. The electronic device 101 may deactivate event Ax, based on transmission of the CANCEL message. In operation 1419, the electronic device 101 may clear a VoLTE call. For example, the electronic device 101 may reactivate event Ax after clearing the VoLTE call, but there is no limitation on a reactivation trigger.

Figure 15:
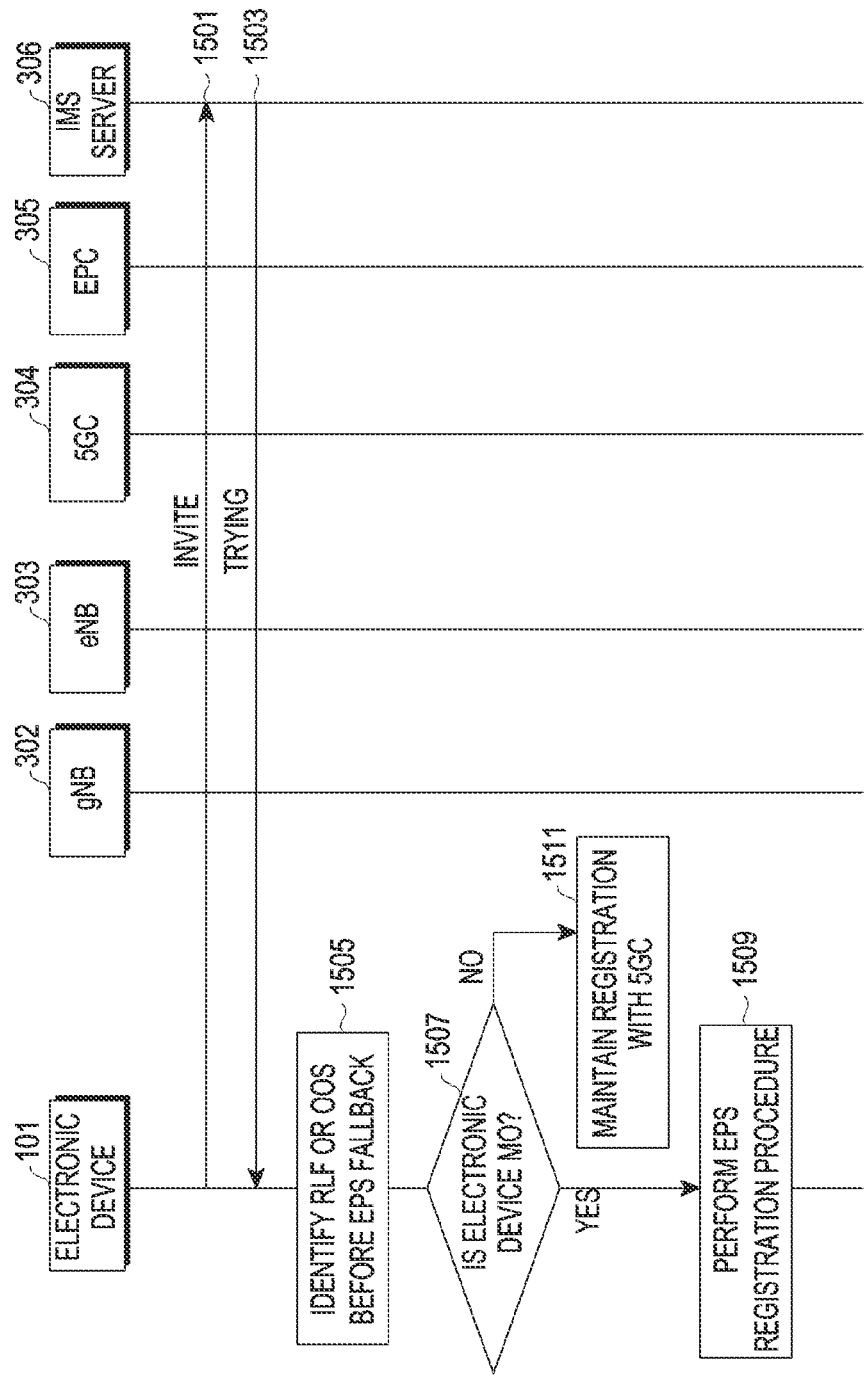
FIG. 15 is a signal flow diagram illustrating an example method of operating an electronic device according to various embodiments.

FIG. 15 is a signal flow diagram illustrating an example method of operating an electronic device according to various embodiments.

According to various embodiments, in operation 1501, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may transmit an INVITE message to an IMS server 306. In operation 1503, the IMS server 306 may transmit a TRYING message to the electronic device 101 in response to the received INVITE message. The electronic device 101 may be configured to perform an EPS fallback, for example, based on reception of the TRYING message as illustrated in FIG. 5. The electronic device 101 may identify a radio link failure (RLF) or an out-of-service (OOS) before performing the EPS fallback in operation 1505.

According to various embodiments, in operation 1507, the electronic device 101 may identify whether the electronic device 101 is an MO terminal. When the electronic device 101 is the MO terminal (Yes in 1507), the electronic device may perform an EPS registration procedure in operation 1509. In this case, the electronic device 101 may deactivate event Ax. Accordingly, as the EPS fallback fails, the electronic device 101 is required to release an RRC connection with a 5GC and to transmit a message based on event Bx to register with an EPC 305. However, when event Ax is activated, registration with the EPS 305 may be delayed, and accordingly the electronic device 101 may deactivate event Ax in order to quickly register with the EPS 305. When the electronic device 101 is an MT terminal (No in 1507), the electronic device 101 may maintain registration with the 5GC in operation 1511. When the electronic device 101 is the MT terminal, the EPS fallback may be likely to be performed by subsequently receiving an INVITE message again, the electronic device 101 may maintain the registration with the 5GC 304. In this case, the electronic device 101 may perform no limitation on an MR event. When the electronic device 101 receives a BYE message including an abnormal cause or a CANCEL message from a network before performing the EPS fallback, the electronic device 101 may perform no limitation on an MR event.

Figure 16:
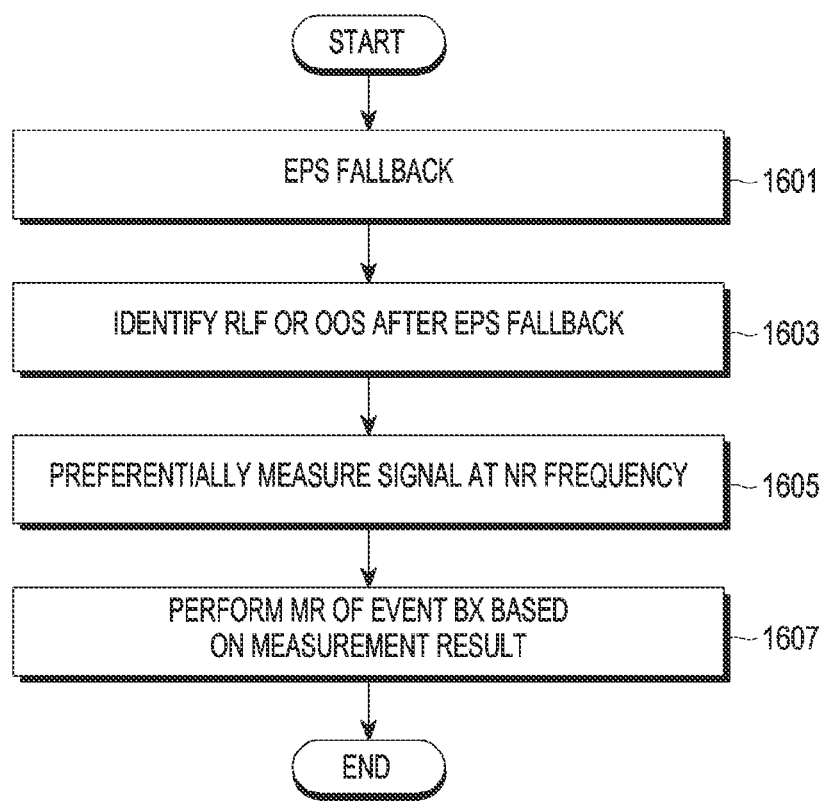
FIG. 16 is a flowchart illustrating an example method of operating an electronic device according to various embodiments.

FIG. 16 is a flowchart illustrating an example method of operating an electronic device according to various embodiments.

According to various embodiments, in operation 1601, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may perform an EPS fallback. The electronic device 101 may store information about a frequency associated with NR in advance before the EPS fallback. In operation 1603, the electronic device 101 may identify an RLF or OOS after the EPS fallback. When an RLF or OOS occurs after the EPS fallback, a handover through a measurement report may be impossible. Accordingly, the electronic device 101 may perform a cell search and may attempt to connect to a network. In this case, the electronic device 101 may be required to return to a 5GS. In operation 1605, the electronic device 101 may preferentially measure a signal at an NR frequency. In an example, the electronic device 101 may perform measurement from a frequency at which the best measurement result is obtained (e.g., a frequency at which the highest RSSI is obtained) among NR frequencies. In operation 1607, the electronic device 101 may perform an MR of event Bx based on a measurement result. When the electronic device 101 measures a signal at an E-UTRA frequency, the electronic device 101 may be likely not to return to the 5GS even in a state of being registered in an EPC and to camp back on an E-UTRA cell due to the EPS fallback. Accordingly, the electronic device 101 may preferentially measure an NR frequency, thereby quickly returning to the 5GS.

Figure 17:
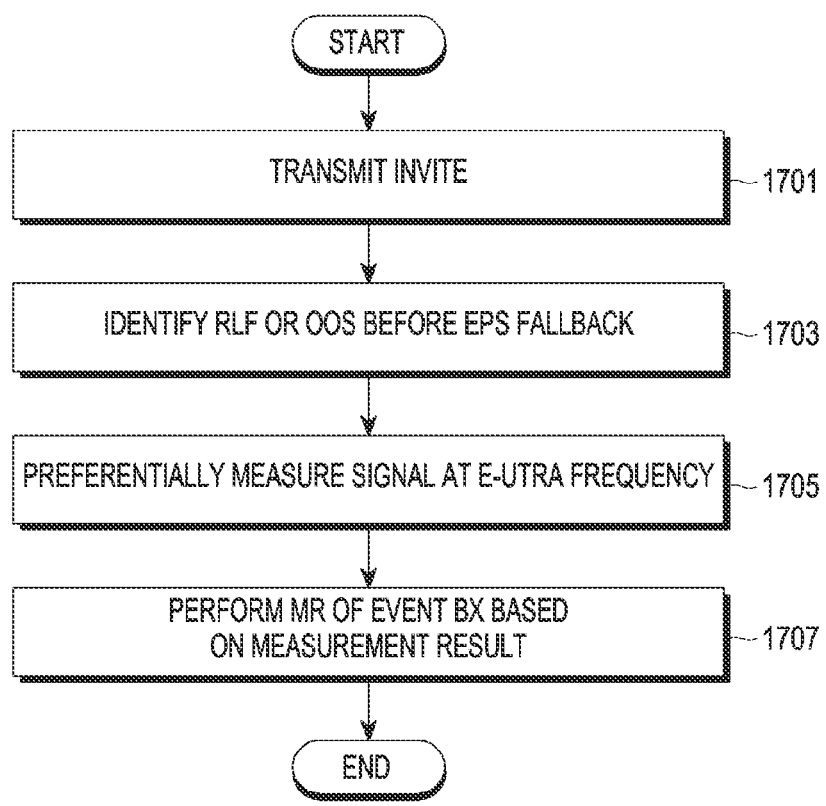
FIG. 17 is a flowchart illustrating an example method of operating an electronic device according to various embodiments.

FIG. 17 is a flowchart illustrating an example method of operating an electronic device according to various embodiments.

According to various embodiments, in operation 1701, the electronic device 101 (e.g., at least one of the processor 120 of FIG. 1, the first communication processor 212 of FIG. 2A, the second communication processor 214 of FIG. 2A, or the integrated communication processor 260 of FIG. 2B) may transmit an INVITE message. In operation 1703, the electronic device 101 may identify an RLF or OOS before an EPS fallback. In operation 1705, the electronic device 101 may preferentially measure a signal at an E-UTRA frequency. For example, it may be more efficient that the electronic device 101 quickly moves to an EPS and transmits the INVITE message than the electronic device 101 continuously transmit the INVITE message based on NR. However, when an RLF or OOS occurs, it is impossible to receive an RRC release message for a redirection. Accordingly, the electronic device 101 is required to autonomously move to the EPS. The electronic device 101 may preferentially measure a signal at an E-UTRA frequency in a cell search. In an example, the electronic device 101 may perform measurement from a frequency at which the best measurement result is obtained (e.g., a frequency at which the highest RSSI is obtained) among E-UTRA frequencies. In operation 1707, the electronic device 101 may perform an MR of event Bx based on a measurement result. Accordingly, the electronic device 101 may autonomously move to the EPS.

Figure 18:
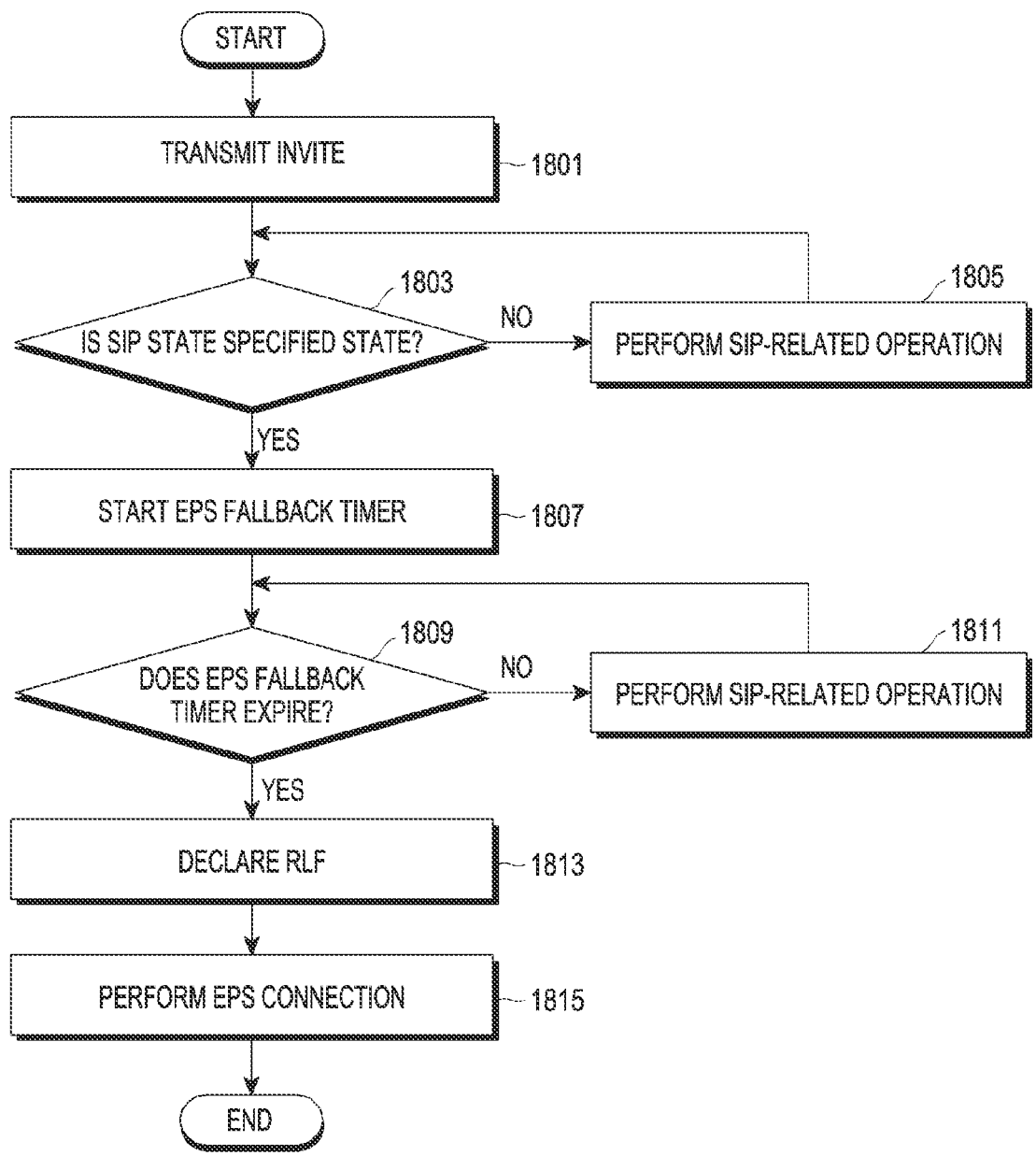
FIG. 18 illustrates an operating method of an electronic device according to various embodiments.

FIG. 18 illustrates an operating method of an electronic device according to various embodiments.

According to various embodiments, in operation 1801, electronic device 101 (e.g. at least one processor (e.g., at least one of the processor 120, the first communication processor 212, the second communication processor 214, or the integrated communication processor 260)) may transmit an INVITE message. In operation 1803, the electronic device 101 may identify whether an SIP state is a specified state. For example, after receiving transmitting the INVITE message, the electronic device 101 may transmit and/or receive at least one message defined in an SIP. The electronic device 101 may identify the SIP state, based on transmission and/or reception of the at least one message defined in the SIP. For example, when the electronic device 101 transmits the INVITE message, the electronic device 101 may identify the SIP state as an INVITE message transmission state. For example, when the electronic device 101 receives a 100 Trying message, the electronic device 101 may identify the SIP state as a 100 Trying message reception state. The electronic device 101 may identify whether the identified current SIP state is the specified state corresponding to an EPS fallback. The SIP state in which the EPS fallback is performed (or a state in which a network transmits a message for redirection (e.g., an RRC release message) to the electronic device 101) may vary depending on each network operator, which will be described with reference to FIG. 19A and FIG. 19B. For example, the electronic device 101 may identify the specified state corresponding to a connected network, or the specified state may be stored by default in the electronic device 101. In one example, the specified state may be the 100 Trying message reception state. In another example, the specified state may be a PACK message transmission state. The foregoing examples are provided merely for illustration, and the specified state corresponding to the EPS fallback is not limited as long as the specified state corresponds to a state corresponding to transmission and/or reception of the message defined by the SIP (e.g., at least one of the INVITE message, a 200 OK message, the 100 Trying message, a 183 session progress message, a PACK message, an UPDATE message, or a 180 Ringing message, without being limited thereto). When the SIP state is not the specified state (No in 1803), the electronic device 101 may perform an SIP-related operation, for example, transmission and/or reception of a message defined in the SIP after the current SIP state in operation 1805.

According to various embodiments, when the SIP state is the specified state (Yes in 1803), the electronic device 101 may start an EPS fallback timer in operation 1807. The EPS fallback timer may be started by the current SIP state being the specified state as a trigger. The EPS fallback timer may be suspended (or reset) by at least one event associated with performing the EPF fallback (e.g., reception of the RRC release message for redirection from the network) as a trigger. Although the expiration time of the EPS fallback timer may be, for example, a preset value (e.g., four seconds) based on time required for the EPS fallback, it will be appreciated by those skilled in the art that the value of the expiration time or a method for configuring the expiration time is not limited. In operation 1809, the electronic device 101 may identify whether the EPS fallback timer expire. As described above, as an event for suspending (or resetting) the EPS fallback timer is not detected in the expiration time of the EPS fallback timer, the EPS fall timer may expires. Before the EPS fallback timer expires (No in 1809), the electronic device 101 may perform an SIP-related operation required in the current SIP state in operation 1811. When the EPS fallback timer expires (Yes in 1809), the electronic device 101 may declare an RLF in operation 1813. In operation 1815, the electronic device 101 may perform at least one operation for connection to an EPS. For example, as described with FIG. 17, the electronic device 101 may preferentially measure a signal at an E-UTRA frequency. The electronic device 101 may perform a procedure for connecting to an E-UTRAN and/or registering with an EPC (EPS) (or a TAU procedure), based on a measurement result. Accordingly, the electronic device 101 may initiatively perform a fallback to the EPS. Subsequently, the electronic device 101 may perform an SIP-related operation after the current SIP state (e.g., transmission and/or reception of a message defined in at least one SIP). Accordingly, the electronic device 101 may establish an IMS voice call session, based on the EPS to which the electronic device 101 falls back. The electronic device 101 may refrain from measurement and/or a measurement report associated with event Ax during the procedure for connecting to the EPS. In one example, the specified condition for the EPS fallback may be configured for each MO terminal and each MT terminal, without being limited thereto.

Figure 19A:
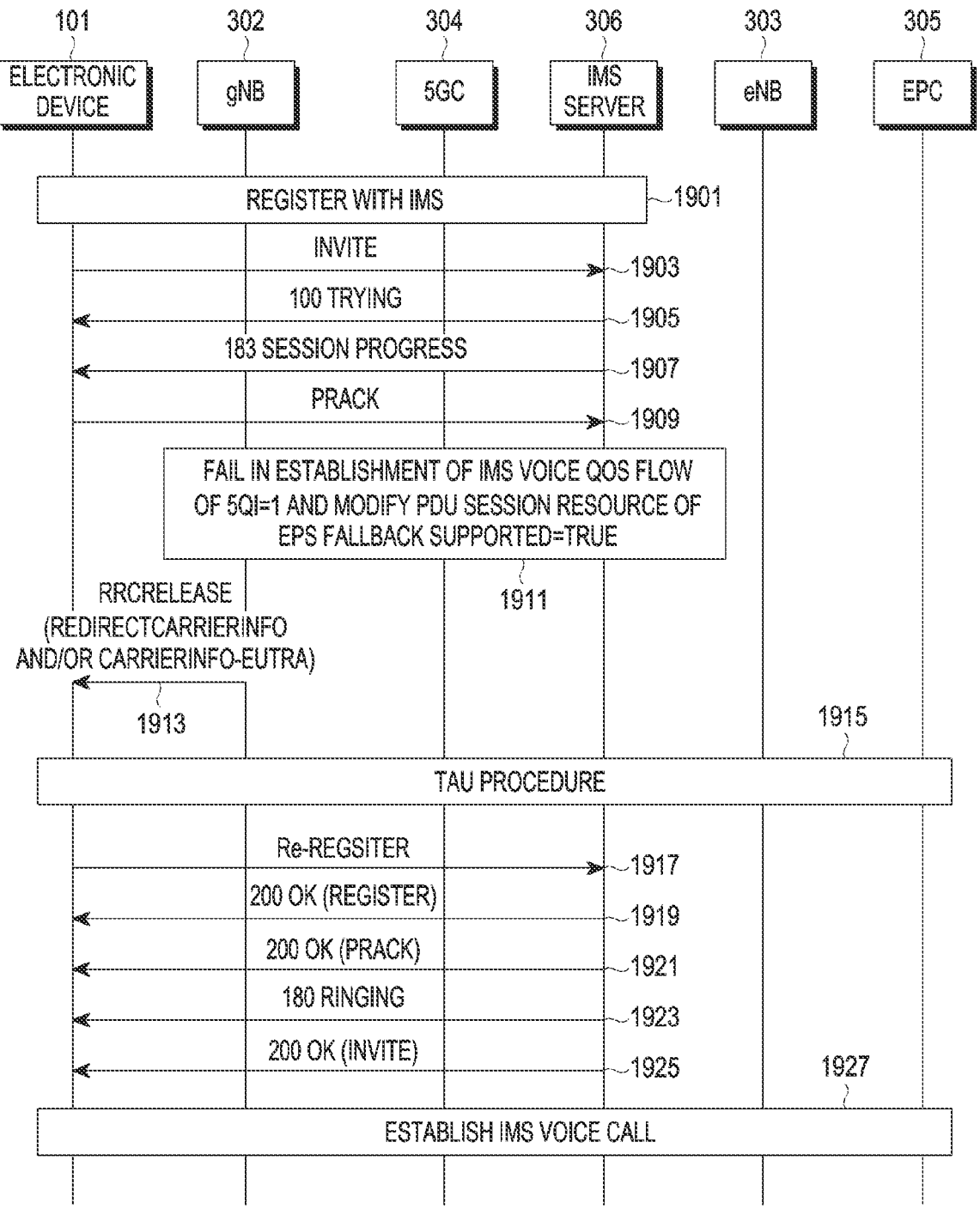
FIG. 19A is a flowchart illustrating an EPS fallback according to various embodiments.

FIG. 19A is a flowchart illustrating an EPS fallback according to various embodiments.

According to various embodiments, in operation 1901, electronic device 101 (e.g. at least one processor (e.g., at least one of the processor 120, the first communication processor 212, the second communication processor 214, or the integrated communication processor 260)) may perform a procedure for registering with an IMS, where a process for registering with an IMS server 306 has been described above, and thus a description thereof is not repeated herein. In operation 1903, the electronic device 101 may transmit an INVITE message to the IMS server 306. In operation 1905, the IMS server 306 may transmit a 100 Trying message to the electronic device 101. In operation 1907, the IMS server 306 may transmit a 183 session progress message to the electronic device 101. In operation 1909, the electronic device 101 may transmit a PRACK message to the IMS server 306. In FIG. 19A, according to a policy of a network operator, after a network receives the PRACK message from the electronic device 101, at least one operation for identifying failure of establishment of an IMS voice QoS flow of 5QI=1 and modifying a PDU session resource of EPS fallback supported=TRUE may be configured to be performed in operation 1911. Since operation 1911 is as described with reference to FIG. 4, a description thereof is not repeated herein. In operation 1913, a gNB 302 may transmit an RRCRelease message to the electronic device 101. The RRCRelease message may include RedirectCarrierInfo and/or CarrierInfo-EUTRA, but is not limited thereto. Upon receiving the RRCRelease message, the electronic device 101 may perform a TAU procedure in operation 1915. Since reception of the RRCRelease message and/or the TAU procedure have been described with reference to FIG. 4, a description thereof is not repeated herein. In an embodiment of FIG. 19A, for the electronic device 101, a specified state for an EPS fallback may be a PRACK message transmission state. In operation 1917, the electronic device 101 may transmit a Re-REGSITER message (or a Register message) to the IMS server 306. After registering the electronic device 101, the IMS server 306 may transmit a 200 OK message corresponding to the Register message to the electronic device 101 in operation 1919. In operation 1921, the IMS server 306 may transmit a 200 OK message corresponding to the PRACK message to the electronic device 101. In operation 1923, the IMS server 306 may transmit a 180 Ringing message to the electronic device 101. Subsequently, when receiving a 200 OK message from an MT terminal, the IMS server 306 may transmit a 200 OK message corresponding to the INVITE message to the electronic device 101 in operation 1925. In operation 1927, the electronic device 101 may establish an IMS voice call with the MT terminal through the IMS server 306.

Figure 19B:
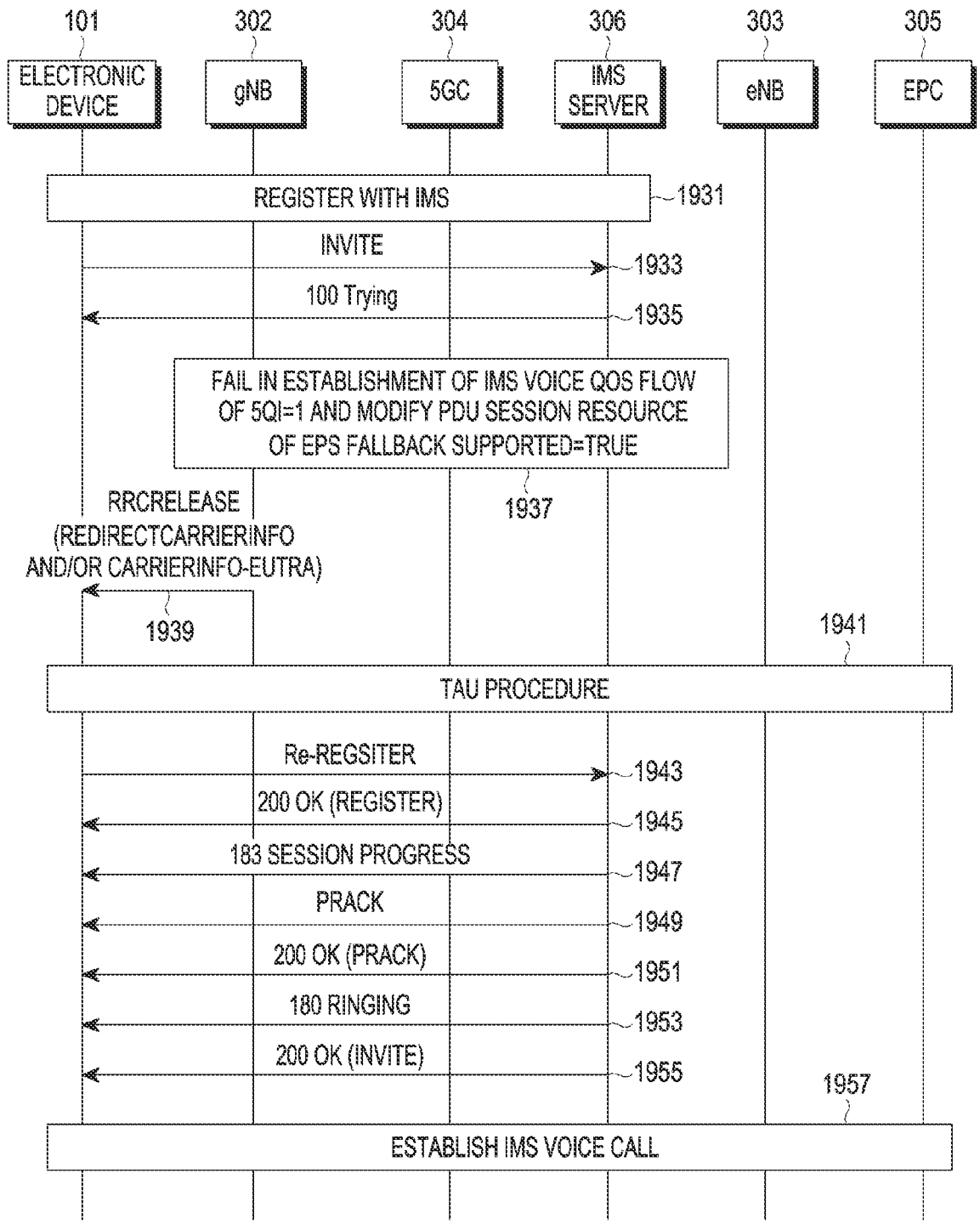
FIG. 19B is a flowchart illustrating an EPS fallback according to various embodiments.

FIG. 19B is a flowchart illustrating an EPS fallback according to various embodiments.

In operation 1931, electronic device 101 (e.g. at least one processor (e.g., at least one of the processor 120, the first communication processor 212, the second communication processor 214, or the integrated communication processor 260)) may perform a procedure for registering with an IMS. In operation 1933, the electronic device 101 may transmit an INVITE message to an IMS server 306. In operation 1935, the IMS server 306 may transmit a 100 Trying message to the electronic device 101. In FIG. 19B, according to a policy of a network operator, after a network transmits the 100 Trying message to the electronic device 101, it may be configured to perform at least one operation for identifying failure of establishment of an IMS voice QoS flow of 5QI=1 and modifying a PDU session resource of EPS fallback supported=TRUE in operation 1937. Since operation 1937 is as described with reference to FIG. 4, a description thereof is not repeated herein. In operation 1939, a gNB 302 may transmit an RRCRelease message to the electronic device 101. The RRCRelease message may include RedirectCarrierInfo and/or CarrierInfo-EUTRA, but is not limited thereto. Upon receiving the RRCRelease message, the electronic device 101 may perform a TAU procedure in operation 1941. Since reception of the RRCRelease message and/or the TAU procedure have been described with reference to FIG. 4, a description thereof is not repeated herein. In an embodiment of FIG. 19B, for the electronic device 101, a specified state for an EPS fallback may be a 100 Trying message reception state. In operation 1943, the electronic device 101 may transmit a Re-REGSITER message (or a Register message) to the IMS server 306. After registering the electronic device 101, the IMS server 306 may transmit a 200 OK message corresponding to the Register message to the electronic device 101 in operation 1945. In operation 1947, the IMS server 306 may transmit a 183 session progress message to the electronic device 101. In operation 1949, the electronic device 101 may transmit a PRACK message to the IMS server 306. In operation 1951, the IMS server 306 may transmit a 200 OK message corresponding to the PRACK message to the electronic device 101. In operation 1953, the IMS server 306 may transmit a 180 Ringing message to the electronic device 101. Subsequently, when receiving a 200 OK message from an MT terminal, the IMS server 306 may transmit a 200 OK message corresponding to the INVITE message to the electronic device 101 in operation 1955. In operation 1957, the electronic device 101 may establish an IMS voice call with the MT terminal through the IMS server 306.

A specified state for an EPS fallback for an MO terminal has been described as the PRACK message transmission state in FIG. 19A, and the specified state for the EPS fallback for an MO terminal has been described as the 100 Trying message transmission state in FIG. 19B. Although not shown, for example, a specified state for an EPS fallback for the MT terminal may be a 183 session progress message transmission and/or reception state. For example, the specified state for the EPS fallback for the MT terminal may be an Ack message transmission and/or reception state. However, it will be appreciated by those skilled in the art that the specified state for the MT terminal is also not limited.

Figure 20:
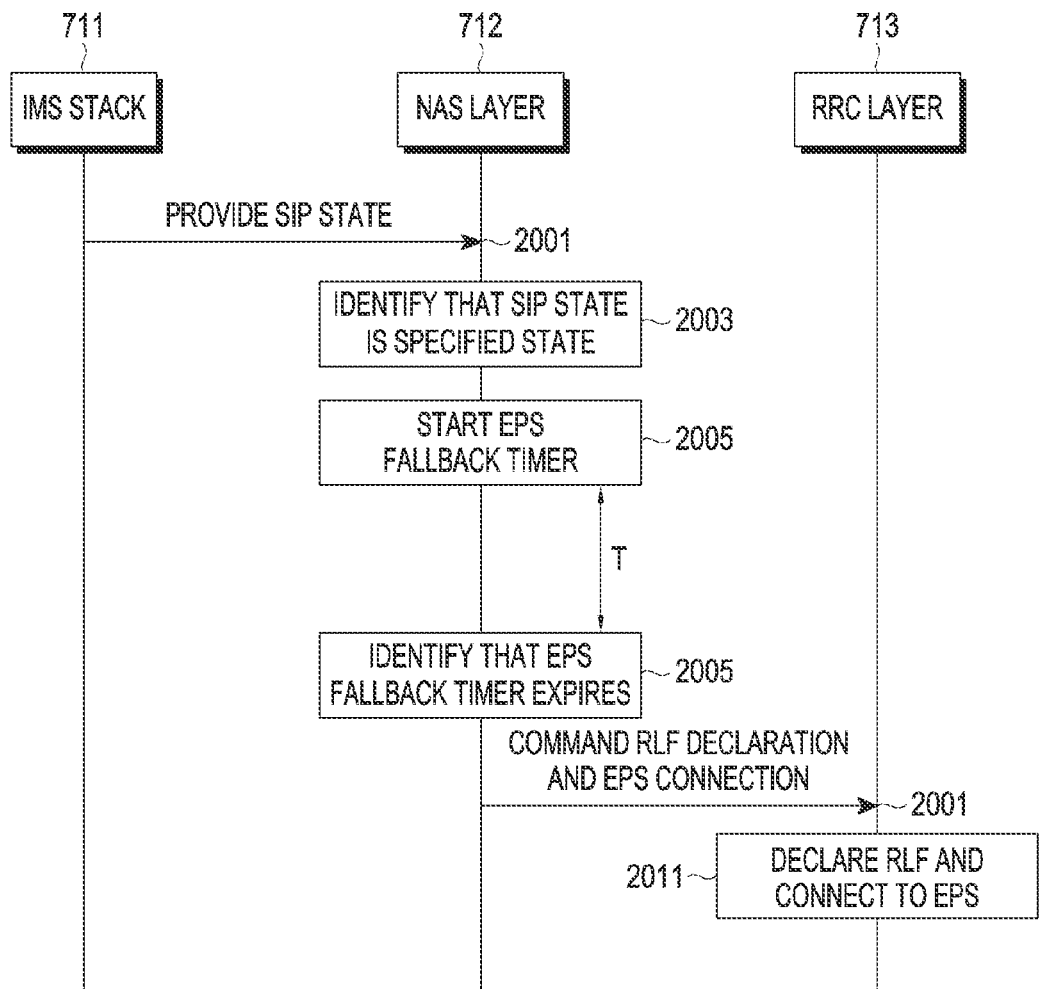
FIG. 20 illustrates operations of an IMS stack, an NAS layer, and an RRC layer according to various embodiments.

FIG. 20 illustrates operations of an IMS stack, an NAS layer, and an RRC layer according to various embodiments.

According to various embodiments, in operation 2001, the IMS stack 711 may provide an SIP state to the NAS layer 712. The IMS stack 711 may perform transmission of a message defined in an SIP to a network and/or reception of the message defined in the SIP from the network, and may identify (or manage) the SIP state, based on the message. The IMS stack 711 may provide a changed SIP state to the NAS layer 712, for example, based on a change in the SIP state. The NAS layer 712 may identify and/or manage a specified state. In operation 2003, the NAS layer 712 may identify that the SIP state provided from the IMS stack 711 is the specified state. In operation 2005, the NAS layer 512 may start an EPS fallback timer. The NAS layer 712 may not identify that an EPS fallback is performed in the expiration time T of the EPS fallback timer, and may identify that the EPS fallback timer expires in operation 2007. In operation 2009, the NAS layer 712 may command the RRC layer 713 to declare an RLF and to connect to an EPS, based on expiration of the EPS fallback timer. In operation 2011, the RRC layer 713 may declare the RLF and may connect to the EPS. In another example, the NAS layer 712 may provide the SIP state to the RRC layer 713. In another example, the RRC layer 713 may manage start, suspension (or resetting), and/or expiration of the EPS fallback timer.

Figure 21:
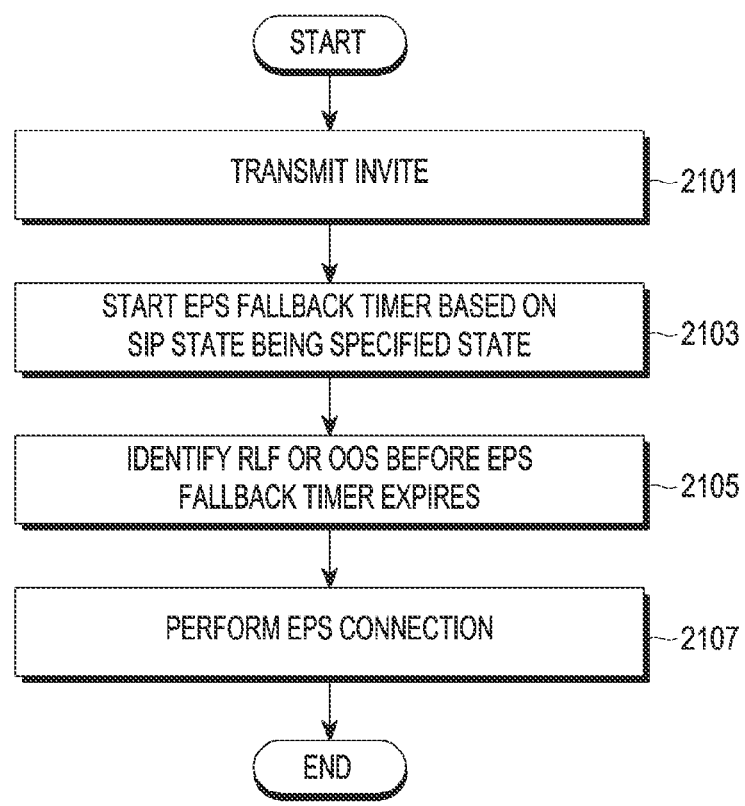
FIG. 21 illustrates an operating method of an electronic device according to various embodiments.

FIG. 21 illustrates an operating method of an electronic device according to various embodiments.

According to various embodiments, in operation 2101, electronic device 101 (e.g. at least one processor (e.g., at least one of the processor 120, the first communication processor 212, the second communication processor 214, or the integrated communication processor 260)) may transmit an INVITE message. In operation 2103, the electronic device 101 may start an EPS fallback timer, based on an SIP state being a specified state. In operation 2105, the electronic device 101 may identify an RLF or an OOS before the EPS fallback timer expires. Upon identifying the RLF or the OOS, the electronic device 101 may perform at least one operation for connection to an EPS in operation 2107. For example, as illustrated in FIG. 17, the electronic device 101 may preferentially measure a signal at an E-UTRA frequency. The electronic device 101 may perform a procedure for connecting to an E-UTRAN and/or registering with an EPC (EPS) (or a TAU procedure), based on a measurement result. Accordingly, the electronic device 101 may initiatively perform a fallback to the EPS. Subsequently, the electronic device 101 may perform an SIP-related operation after the current SIP state (e.g., transmission and/or reception of a message defined in at least one SIP). Accordingly, the electronic device 101 may establish an IMS voice call session, based on the EPS to which the electronic device 101 falls back. The electronic device 101 may refrain from measurement and/or a measurement report associated with event Ax during the procedure for connecting to the EPS. In one example, the specified condition for the EPS fallback may be configured for each MO terminal and each MT terminal, without being limited thereto. According to various embodiments, the electronic device 101 may not manage (or define) the EPS fallback timer. The electronic device 101 may identify the RLF or the OOS after identifying that the SIP state is the specified state. In this case, the electronic device 101 may initiatively perform the fallback to the EPS.

According to various example embodiments, an electronic device (e.g., the electronic device 101) may include at least one processor (e.g., at least one of the processor 120, the first communication processor 212, the second communication processor 214, or the integrated communication processor 260), and the at least one processor may be configured to: identify occurrence of an event associated with an internet protocol multimedia subsystem (IMS) voice service in a state of being registered in a first core network based on a first radio access technology (RAT), identify at least one measurement report event corresponding to the occurred event among at least one first measurement report event associated with the first RAT and at least one second measurement report event associated with a second RAT different from the first RAT in the state of being registered in the first core network based on the first RAT, the first RAT and the second RAT being configured in the electronic device, and refrain from a measurement report corresponding to the identified measurement report event.

According to various example embodiments, the at least one processor may, as at least part of the refraining from the measurement report corresponding to the identified measurement report event, be configured to refrain from measurement at a frequency associated with at least one neighbor cell associated with the identified measurement report event.

According to various example embodiments, based on a result of measurement at a frequency associated with at least one neighbor cell associated with the identified measurement report event satisfying a reporting criterion, the at least one processor may, as at least part of the refraining from the measurement report corresponding to the identified measurement report event, be configured to refrain from a measurement report corresponding to the result of the measurement.

According to various example embodiments, the at least one processor may, as at least part of the identifying of the occurrence of the event associated with the IMS voice service in the state of being registered in the first core network based on the first RAT, be configured to: identify a call start based on the IMS voice service as the event in a state of being registered in a fifth generation core (5GC) based on a new radio (NR), wherein the at least one processor may, as at least part of the refraining from the measurement report corresponding to the identified measurement report event, be configured to refrain from a measurement report associated with a neighbor cell corresponding to the NR based on the electronic device being configured to fall back to an evolved packet system (EPS) for the IMS voice service.

According to various example embodiments, the at least one processor may be further configured to: perform a measurement report based on a result of measurement on a neighbor cell corresponding to an evolved universal mobile telecommunications system (UMTS) terrestrial radio access (E-UTRA) while refraining from the measurement report associated with the neighbor cell corresponding to the NR, receive a message causing a movement to the neighbor cell corresponding to the E-UTRA from a network based on the measurement report, and resume the measurement report associated with the neighbor cell corresponding to the NR based on receiving the message.

According to various example embodiments, the at least one processor may, as at least part of the identifying of the occurrence of the event associated with the IMS voice service in the state of being registered in the first core network based on the first RAT, be configured to identify completion of an EPS fallback according to a call start based on the IMS voice service as the event in a state of being registered in a 5GC based on a NR, wherein the at least one processor may, as at least part of the refraining from the measurement report corresponding to the identified measurement report event, be configured to refrain from a measurement report associated with a neighbor cell corresponding to the NR.

According to various example embodiments, the at least one processor may be further configured to set up a dedicated bearer for the IMS voice service based on an evolved packet core (EPC) while refraining from the measurement report associated with the neighbor cell corresponding to the NR, and resume the measurement report associated with the neighbor cell corresponding to the NR, based on setup of the dedicated bearer.

According to various example embodiments, the at least one processor may, as at least part of the identifying of the occurrence of the event associated with the IMS voice service in the state of being registered in the first core network based on the first RAT, be configured to identify end of a call as the event after the electronic device performs an EPS fallback for the call based on the IMS voice service, wherein the at least one processor may, as at least part of the refraining from the measurement report corresponding to the identified measurement report event, be configured to refrain from a measurement report associated with a neighbor cell corresponding to an E-UTRA.

According to various example embodiments, the at least one processor may be further configured to: perform at least one operation for returning to a 5GS, based on the end of the call, and resume the measurement report associated with the neighbor cell corresponding to the E-UTRA, based on return to the 5GS.

According to various example embodiments, the at least one processor may, as at least part of the identifying of the occurrence of the event associated with the IMS voice service in the state of being registered in the first core network based on the first RAT, be configured to: identify a call start based on the IMS voice service as the event, in a state of being registered in an EPC based on an E-UTRA, wherein the at least one processor may, as at least part of the refraining from the measurement report corresponding to the identified measurement report event, be configured to refrain from a measurement report associated with a neighbor cell corresponding to a NR.

According to various example embodiments, the at least one processor may be further configured to: set up a dedicated bearer for the IMS voice service based on the EPC while refraining from the measurement report associated with the neighbor cell corresponding to the NR, and resume the measurement report associated with the neighbor cell corresponding to the NR, based on setup of the dedicated bearer.

According to various example embodiments, the at least one processor may, as at least part of the identifying of the occurrence of the event associated with the IMS voice service in the state of being registered in the first core network based on the first RAT, be configured to: identify call rejection as the event before an EPS fallback for the IMS voice service is performed in a state of being registered in a 5GC based on a NR, wherein the at least one processor may, as at least part of the refraining from the measurement report corresponding to the identified measurement report event, be configured to refrain from a measurement report associated with a neighbor cell corresponding to an E-UTRA.

According to various example embodiments, the at least one processor may be further configured to: identify call end while refraining from the measurement report associated with the neighbor cell corresponding to the E-UTRA, and resume the measurement report associated with the neighbor cell corresponding to the E-UTRA, based on identification of the call end.

According to various example embodiments, the at least one processor may, as at least part of the identifying of the occurrence of the event associated with the IMS voice service in the state of being registered in the first core network based on the first RAT, be configured to identify call rejection as the event in a state of being registered in an EPC based on an E-UTRA by performing an EPS fallback for the IMS voice service in a state of being registered in a 5GC based on a NR, wherein the at least one processor may, as at least part of the refraining from the measurement report corresponding to the identified measurement report event, be configured to refrain from a measurement report associated with a neighbor cell corresponding to the E-UTRA.

According to various example embodiments, the at least one processor may be further configured to: perform at least one operation for returning to a 5GS while refraining from the measurement report associated with the neighbor cell corresponding to the E-UTRA, and resume the measurement report associated with the neighbor cell corresponding to the E-UTRA, based on return to the 5GS.

According to various example embodiments, the at least one processor may, as at least part of the identifying of the occurrence of the event associated with the IMS voice service in the state of being registered in the first core network based on the first RAT, be configured to: identify call failure as the event before an EPS fallback for the IMS voice service is performed in a state of being registered in a 5GC based on a NR, wherein the at least one processor may, as at least part of the refraining from the measurement report corresponding to the identified measurement report event, be configured to refrain from a measurement report associated with a neighbor cell corresponding to the NR, based on the electronic device being a mobile originating (MO) terminal.

According to various example embodiments, the at least one processor may, as at least part of the identifying of the occurrence of the event associated with the IMS voice service in the state of being registered in the first core network based on the first RAT, be configured to: identify call failure as the event in a state of being registered in an EPC based on an E-UTRA by performing an EPS fallback for the IMS voice service in a state of being registered in a 5GC based on a NR, wherein the at least one processor may, as at least part of the refraining from the measurement report corresponding to the identified measurement report event, be configured to refrain from a measurement report associated with a neighbor cell corresponding to the E-UTRA.

According to various example embodiments, the at least one processor may, as at least part of the refraining from the measurement report corresponding to the identified measurement report event, be configured to refrain from the measurement report corresponding to the identified measurement report event based on a strength of a signal from a serving cell corresponding to the first RAT not satisfying a specified condition.

According to various example embodiments, a method of operating an electronic device may include: identifying occurrence of an event associated with an internet protocol multimedia subsystem (IMS) voice service, in a state of being registered in a first core network based on a first radio access technology (RAT), identifying at least one measurement report event corresponding to the occurred event among at least one first measurement report event associated with the first RAT and at least one second measurement report event associated with a second RAT different from the first RAT in the state of being registered in the first core network based on the first RAT, the first RAT and the second RAT being configured in the electronic device, and refraining from a measurement report corresponding to the identified measurement report event.

According to various example embodiments, the refraining from the measurement report corresponding to the identified measurement report event may include refraining from measurement at a frequency associated with at least one neighbor cell associated with the identified measurement report event.

According to various embodiments, when the first RAT is NR and the first core network is a 5GC, the at least one processor may be further configured to identify a current SIP state of the electronic device and to start a timer for an EPS fallback for an IMS voice service from the NR and/or the 5GC, based on the current SIP state being a specified state.

According to various embodiments, the at least one processor may be further configured to declare an RLF, based on expiration of the timer for the EPS fallback, and to perform at least one operation for connection to an EPS.

According to various embodiments, at least one processor may be further configured to perform at least one operation for connection to an EPS, based on identification of an RLF or an out-of-service (OOS), before the timer for the EPS fallback expires.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor including processing circuitry,
   memory storing instructions that, when executed by the at least one processor, cause the electronic device to:
   based on identification of call start, perform an evolved packet system (EPS) fallback while the electronic device is registered to a fifth generation core (5GC);
   based on a completion of the EPS fallback, refrain from a measurement at a frequency associated with at least one neighbor cell corresponding to the 5GC;
   perform setting up of a dedicated bearer in an evolved universal mobile telecommunications system (UMTS) terrestrial radio access (E-UTRA) while the measurement with respect to at least one cell corresponding to the 5GC is restricted; and
   when the setting up of the dedicated bearer in the E-UTRA is completed, resume the measurement at the frequency associated with at least one neighbor cell corresponding to the 5GC based on a RAT related to a call connection request corresponding to the call start being the E-UTRA.

2. The electronic device of claim 1, wherein the instructions cause the electronic device to refrain from a measurement report corresponding to a result of the measurement, based on at least one neighbor cell associated with the 5GC satisfying a condition for the measurement.

3. The electronic device of claim 1, wherein the instructions cause the electronic device to:
   identify the call start based on an internet protocol multimedia subsystem (IMS) voice service in a state of being registered in the 5GC based on a new radio (NR), and
   refrain from a measurement report associated with a neighbor cell corresponding to the NR based on the electronic device being configured to fall back to an evolved packet system (EPS) for the IMS voice service.

4. The electronic device of claim 3, wherein the instructions cause the electronic device to:
   perform a measurement report based on a result of measurement on a neighbor cell corresponding to the E-UTRA while refraining from the measurement report associated with the neighbor cell corresponding to the NR,
   receive a message causing a movement to the neighbor cell corresponding to the E-UTRA from a network based on the measurement report, and
   resume the measurement report associated with the neighbor cell corresponding to the 5GC based on receiving the message.

5. The electronic device of claim 1, wherein the instructions cause the electronic device to:
   identify end of a call after the electronic device performs the EPS fallback for the call based on an internet protocol multimedia subsystem (IMS) voice service, refrain from a measurement report associated with a neighbor cell corresponding to the E-UTRA.

6. The electronic device of claim 5, wherein the instructions cause the electronic device to:
perform at least one operation for returning to a fifth generation system (5GS) based on the end of the call, and
resume the measurement report associated with the neighbor cell corresponding to the E-UTRA based on return to the 5GS.

7. The electronic device of claim 1, wherein the instructions cause the electronic device to:
identify the call start based on an internet protocol multimedia subsystem (IMS) voice service, in a state of being registered in an evolved packet core (EPC) based on the E-UTRA,
refrain from a measurement report associated with a neighbor cell corresponding to a new radio (NR).

8. The electronic device of claim 1, wherein the instructions cause the electronic device to:
identify call rejection as the event before the EPS fallback for an internet protocol multimedia subsystem (IMS) voice service is performed, in a state of being registered in a 5GC based on a new radio (NR), and
refrain from a measurement report associated with a neighbor cell corresponding to the E-UTRA.

9. The electronic device of claim 8, wherein the instructions cause the electronic device to:
identify call end while refraining from the measurement report associated with the neighbor cell corresponding to the E-UTRA, and
resume the measurement report associated with the neighbor cell corresponding to the E-UTRA, based on identification of the call end.

10. The electronic device of claim 1, wherein the instructions cause the electronic device to declare an radio link failure (RLF), based on expiration of a timer for the EPS fallback, and to perform at least one operation for connection to an EPS.

11. The electronic device of claim 1, wherein the instructions cause the electronic device to perform at least one operation for connection to an EPS, based on identification of an radio link failure (RLF) or an out-of-service (OOS), before a timer for the EPS fallback expires.

12. A non-transitory computer-readable recording medium storing instructions that, when executed at least one processor of an electronic device, individually and/or collectively, cause the electronic device to:
based on identification of call start, perform an evolved packet system (EPS) fallback while the electronic device is registered to a fifth generation core (5GC),
based on a completion of the EPS fallback, refrain from a measurement at a frequency associated with at least one neighbor cell corresponding to the 5GC,
perform setting up of a dedicated bearer in evolved universal mobile telecommunications system (UMTS) terrestrial radio access (E-UTRA) while the measurement with respect to at least one cell corresponding to the 5GC is restricted, and
when the setting up of the dedicated bearer in the E-UTRA is completed, resume the measurement at the frequency associated with at least one neighbor cell corresponding to the 5GC based on a RAT related to a call connection request corresponding to the call start being the E-UTRA.

13. The non-transitory computer-readable recording medium of claim 12, wherein the instructions cause the electronic device to refrain from a measurement report corresponding to a result of the measurement, based on at least one neighbor cell associated with the 5GC being satisfying a condition for the measurement.

14. The non-transitory computer-readable recording medium of claim 12, wherein the instructions cause the electronic device to:
identify the call start based on the IMS voice service in a state of being registered in the 5GC based on a new radio (NR),
refrain from a measurement report associated with a neighbor cell corresponding to the NR based on the electronic device being configured to fall back to an EPS for an internet protocol multimedia subsystem (IMS) voice service.

* * * * *